United States Patent
Raslambekov

(10) Patent No.: US 10,856,954 B1
(45) Date of Patent: Dec. 8, 2020

(54) SYSTEMS AND METHODS FOR DETERMINING TOOTH CENTER OF RESISTANCE

(71) Applicant: Oxilio Ltd, Larnaca (CY)

(72) Inventor: Islam Khasanovich Raslambekov, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

(21) Appl. No.: 16/877,972

(22) Filed: May 19, 2020

(51) Int. Cl.
| | |
|---|---|
| A61C 7/00 | (2006.01) |
| G06T 7/00 | (2017.01) |
| G06T 7/60 | (2017.01) |
| G06T 17/20 | (2006.01) |

(52) U.S. Cl.
CPC ............ *A61C 7/002* (2013.01); *G06T 7/0012* (2013.01); *G06T 7/60* (2013.01); *G06T 17/20* (2013.01); *A61C 2007/004* (2013.01); *G06T 2207/30036* (2013.01); *G06T 2210/21* (2013.01); *G06T 2210/41* (2013.01)

(58) Field of Classification Search
CPC .......... G06T 7/60; G06T 7/0012; A61C 7/002
See application file for complete search history.

(56) References Cited

U.S. PATENT DOCUMENTS

| | | | |
|---|---|---|---|
| 5,605,459 A | 2/1997 | Kuroda et al. | |
| 7,374,421 B2 | 5/2008 | Solomon | |
| 8,126,726 B2 | 2/2012 | Matov et al. | |
| 8,512,037 B2 * | 8/2013 | Andreiko | A61C 7/28 433/24 |
| 2002/0072027 A1 * | 6/2002 | Chishti | A61C 7/00 433/24 |
| 2006/0228664 A1 * | 10/2006 | Castner | A61C 7/287 433/11 |
| 2008/0311535 A1 | 12/2008 | Andreiko et al. | |
| 2009/0191502 A1 * | 7/2009 | Cao | A61C 7/08 433/24 |
| 2010/0167243 A1 | 7/2010 | Spiridonov et al. | |
| 2010/0169057 A1 | 7/2010 | Hultgren et al. | |
| 2010/0178628 A1 | 7/2010 | Kim et al. | |
| 2018/0360567 A1 * | 12/2018 | Xue | A61C 7/002 |
| 2019/0000593 A1 * | 1/2019 | Cam | A61C 7/08 |
| 2019/0282333 A1 * | 9/2019 | Matov | A61C 7/20 |
| 2019/0321136 A1 * | 10/2019 | Martz | B33Y 80/00 |

\* cited by examiner

*Primary Examiner* — Kim Y Vu
*Assistant Examiner* — Molly Delaney
(74) *Attorney, Agent, or Firm* — BCF LLP

(57) ABSTRACT

A method and a system for determining a center of resistance point of a tooth for orthodontic treatment planning are provided. The method comprises: obtaining a tooth mesh from image data associated with a tooth crown of a patient; identifying a mesiodistal center of the tooth crown; determining a reference plane in the image data to extend through the mesiodistal center; determining an intersection curve based on an intersection of the reference plane and the tooth mesh, the intersection curve following a shape of the surface of the crown at the reference plane; determining a tooth axis of the tooth crown based on the intersection curve; determining a crown height of the tooth crown based on the tooth axis; and determining the center of resistance of the tooth based on the determined crown height and the determined tooth axis.

20 Claims, 14 Drawing Sheets

SYSTEMS AND METHODS FOR DETERMINING TOOTH CENTER OF RESISTANCE

The present technology relates to systems and methods for planning an orthodontic treatment for a patient, in general; and more specifically to determining a center of resistance point (CR point) for patient's teeth.

BACKGROUND

In orthodontics, treatments for achieving alignment of malposed teeth in a patient include applying various orthodontic devices, such as aligners or braces that are configured to exert a force to the patient's teeth, thereby either causing the teeth to move or to a retain given position. In order to plan tooth movements in the course of a given orthodontic treatment, practitioners typically consider a plurality of reference points for applying forces exerted by the orthodontic devices.

One of such reference points is a resistance point (also known as a Center of Resistance (CR) point) of a given tooth. In general, the given tooth is attached to an alveolar bone of one of a patient's maxilla (an upper jaw) and a patient's mandible (a lower jaw) by surrounding periodontal tissue (also collectively referred to herein as "periodontal ligament"). Thus, physically, the given tooth may be considered as a body restrained in the alveolar bone by forces applied by the periodontal ligaments and neighboring teeth, for example, having its associated center of gravity (a center of mass). Accordingly, the CR point of the given tooth may be defined as its center of gravity. To that end, applying a force, at a given direction, to the CR point of the given tooth would result in a translation movement thereof.

Typically, the CR point is determined to be located on a tooth axis of the given tooth, which may be defined as an imaginary line extending through a crown portion and a root portion of the given tooth, around which the given tooth is most symmetrically distributed. It will be appreciated that because of differences between teeth of a patient, and also between teeth of different patients, the CR point will also vary between teeth. Thus, a more accurate determination of the tooth axis of the given tooth and the CR point may provide for a more predictable planning of the given orthodontic treatment for the patient. This may further allow, for example, to accurately model some aspects of dynamics of the given tooth in the course of the planned orthodontic treatment using, for example, a digital representation thereof. In this regard, the more accurate determination of the tooth axis and the CR point of the given tooth may further enable to achieve the object of the given orthodontic treatment, that is, the alignment of the patient's teeth, more efficiently and effectively.

Certain prior art approaches have been proposed to address the above-identified technical problem of determining the tooth axis based on determining certain reference points associated with the crown portion and the root portion of the given tooth.

U.S. Pat. No. 8,512,037-B2 issued on Aug. 20, 2013, assigned to Ormco Corp., and entitled "Custom Orthodontic Appliance System and Method" discloses various features for a custom orthodontic appliance manufacturing or designing system. These include features for inputting of data of patient anatomy and practitioner decisions, features for interactively or automatically manipulating data to arrive at appliance characteristics, and features for affecting design or manufacture of the appliance.

United States Patent Application Publication No.: 2008/311,535-A1 filed on May 5, 2008, assigned to Ormco Corp., and entitled "Torque Overcorrection Model" discloses a custom orthodontic appliance comprised of brackets to be positioned on a patient's teeth, and an archwire, and is customized to provide a desired torque to a tooth by selecting an angle for the slot of at least one bracket so as to provide a torque interaction between that bracket slot and the archwire. The torque interaction is computed to compensate for tooth tilt resulting from misalignment of the force vector applied by the archwire with the tooth center of resistance. The torque interaction is computed at the desired final position of the teeth, and may be computed to provide for an applied torque even where the tooth is positioned in the desired final tooth position to compensate for force diminution. Material properties of the archwire and the relative archwire slot geometry are evaluated to determine an archwire/slot angular offset in which torque is applied to the bracket.

U.S. Pat. No. 8,126,726-B2 issued on Feb. 28, 2012, assigned to Align Technology Inc., and entitled "System and Method for Facilitating Automated Dental Measurements and Diagnostics" discloses acquiring a digital model of a patient's teeth, automatically detecting reference data or features based on the digital model, and automatically computing dental measurements based on said reference data or features, where the dental measurements are associated with an occlusal characteristic of the patient are disclosed.

SUMMARY

It is an object of the present technology to ameliorate at least some of the inconveniences present in the prior art.

The developers of the present technology have realized that determining the tooth axis for the given tooth may be performed more accurately when considering certain specifics of the crown portion of the given tooth. Specifically, the developers have devised a method directed to generating the tooth axis based on a reference plane intersecting the crown portion of the given tooth perpendicular to a mesio-distal direction associated therewith. Further, based on so determined tooth axis and some reference data indicative of dimensions of the given tooth, the CR point thereon may be determined.

Non-limiting embodiments of the present technology may thus enable to accurately determine the tooth axis based on image data of patient's arch forms indicative solely of crown portions of the patient's teeth (such as that obtained using a conventional intraoral scanner, for example), and not considering the root portions thereof, which may be exempt from obtaining additional image data associated with the patient, such as CT/magnetic resonance scans or a panoramic radiograph, for example.

Accordingly, the non-limiting embodiments of the present technology are directed to more efficient and effective methods and systems for determining the tooth axis, and further determining thereon the CR point allowing for better predictability of the orthodontic treatment planning.

Therefore, according to a first broad aspect of the present technology, there is provided a method for determining a center of resistance point of a tooth for orthodontic treatment planning. The method is executable by a processor. The method comprises: obtaining a tooth mesh from image data associated with a tooth crown of a patient, the tooth mesh representative of a surface of the tooth crown; identifying an internal reference point in the image data, the internal reference point being a mesiodistal center of the tooth crown, the identifying the internal reference point comprising: obtaining a mesial point on a mesial side of the tooth crown, and a distal point on a distal side of the tooth crown; generating a mesiodistal line joining the mesial point and the distal point; identifying the mesiodistal center as a midpoint on the mesiodistal line; determining a reference plane in the image data, the reference plane being perpendicular to the mesiodistal line and extending through the mesiodistal center; determining an intersection curve based on an intersection of the reference plane and the tooth mesh, the intersection curve following a shape of the surface of the crown at the reference plane; determining a tooth axis of the tooth crown based on the intersection curve; determining a crown height of the tooth crown based on the tooth axis; and determining the center of resistance of the tooth based on the determined crown height and the determined tooth axis.

In some implementations of the method, the determining the tooth axis of the tooth crown based on the intersection curve comprises: bisecting the intersection curve into two intersection curve parts based on a separation point; generating an average intersection curve using the two intersection curve parts; generating, based on the average intersection curve, a guide axis using a linear regression algorithm; and determining the tooth axis based on the guide axis.

In some implementations of the method, if the tooth is a premolar tooth or a molar tooth, the separation point comprises: a point on the intersection curve which is closest to the internal reference point, and the tooth axis is determined as the guide axis.

In some implementations of the method, if the tooth is an incisor tooth or a canine tooth, the separation point comprises: for maxillary teeth, a minimum point of the intersection curve along a Z axis direction for maxillary teeth; and for mandibular teeth, a maximum point of the intersection curve in a Z axis direction for mandibular teeth.

In some implementations of the method, the determining the tooth axis comprises: determining a linguolabial reference plane which is parallel to the mesiodistal line; dissecting the surface of the tooth crown, by the linguolabial reference plane, into a lingual surface and a labial surface; identifying lingual naked edges on the lingual surface of the surface of the tooth crown; identifying labial naked edges on the labial surface of the surface of the tooth crown; generating a lingual edge curve based on projecting the lingual naked edges onto the linguolabial reference plane; generating a labial edge curve based on projecting the labial naked edges onto the linguolabial reference plane; generating, based on the lingual edge curve and the labial edge curve, an average linguolabial edge curve; determining a linguolabial edge point, the determining comprises: for maxillary teeth, identifying a maximum point of the linguolabial edge curve along a Y axis associated with the linguolabial reference plane; and for mandibular teeth, identifying a minimum point of the linguolabial edge curve along the Y axis associated with the linguolabial reference plane; and determining the tooth axis by rotating the guide axis around Z axis associated with the linguolabial reference plane until it matches the linguolabial edge point on the linguolabial plane.

In some implementations of the method, the determining the crown height comprises generating a bounding box around the tooth mesh and along the determined tooth axis, and determining the crown height as a height of the tooth mesh along the tooth axis.

In some implementations of the method, the determining the crown height comprises projecting tooth mesh vertices of the tooth mesh onto the tooth axis, and determining a distance difference between a minimum point and maximum point along the tooth axis.

In some implementations of the method, the method further comprises modulating the determined crown height by a predetermined distance.

In some implementations of the method, the determining the center of resistance of the tooth based on the determined crown height and the determined tooth axis comprises: retrieving, from a memory, an approximate root length based on the determined crown height; dividing the approximate root length by two to define a center of resistance distance; determining the center of resistance of the tooth as a point along the tooth axis at a distance relating to the center of resistance distance from a crown start point.

In some implementations of the method, the image data is associated with a plurality of teeth crowns of the patient, and the determining the tooth mesh from the image data comprises determining a separate tooth mesh for each one of the plurality of teeth crowns.

In some implementations of the method, the method further comprises displaying the image data and one or both of the determined tooth axis and the determined center of resistance.

In some implementations of the method, the method further comprises determining an orthodontic treatment using the determined center of resistance.

According to a second broad aspect of the present technology, there is provided a method for determining a center of resistance point of a tooth for orthodontic treatment planning. The method is executable by a processor. The method comprises: receiving image data associated with a tooth crown of a patient; determining a tooth mesh from the image data, the tooth mesh representative of a surface of the tooth crown; identifying an internal reference point in the image data, the internal reference point being based on a predetermined internal reference point instruction for locating the internal reference point in a given tooth crown; determining a reference plane in the image data, the reference plane crossing the internal reference point and the tooth mesh and being based on a predetermined reference plane instruction for locating the reference plane relative to the internal reference point for a given tooth; determining an intersection curve based on an intersection of the reference plane and the tooth mesh, the intersection curve following a shape of the surface of the crown at the reference plane; determining a tooth axis of the tooth crown based on the intersection curve; determining a crown height of the tooth crown based on the tooth axis; and determining the center of resistance of the tooth based on the determined crown height and the determined tooth axis.

In some implementations of the method, the internal reference point comprises a mesiodistal center of the tooth crown, the identifying the internal reference point comprising: obtaining a mesial point on a mesial side of the tooth crown, and a distal point on a distal side of the tooth crown, generating a mesiodistal line joining the mesial point and the distal point; and identifying the mesiodistal center as a midpoint on the mesiodistal line.

In some implementations of the method, the reference plane is perpendicular to the mesiodistal line and extends through the mesiodistal center.

In some implementations of the method, the determining the tooth axis of the tooth crown based on the intersection curve comprises: bisecting the intersection curve into two intersection curve parts based on a separation point; generating an average intersection curve using the two intersection curve parts; generating, based on the average intersection curve, a guide axis using a linear regression algorithm; and determining the tooth axis based on the guide axis.

In some implementations of the method, if the tooth is a premolar tooth or a molar tooth, the separation point comprises: a point on the intersection curve which is closest to the internal reference point, and the tooth axis is determined as the guide axis; and if the tooth is an incisor tooth or a canine tooth, the separation point comprises: for maxillary teeth, a minimum point of the intersection curve along a Z axis direction for maxillary teeth; and for mandibular teeth, a maximum point of the intersection curve in a Z axis direction for mandibular teeth.

In some implementations of the method, the determining the tooth axis comprises: determining a linguolabial reference plane which is parallel to the mesiodistal line; dissecting the surface of the tooth crown, by the linguolabial reference plane, into a lingual surface and a labial surface; identifying lingual naked edges on the lingual surface of the surface of the tooth crown; identifying labial naked edges on the labial surface of the surface of the tooth crown; generating a lingual edge curve based on projecting the lingual naked edges onto the linguolabial reference plane; generating a labial edge curve based on projecting the labial naked edges onto the linguolabial reference plane; generating, based on the lingual edge curve and the labial edge curve, an average linguolabial edge curve; determining a linguolabial edge point, the determining comprises: for maxillary teeth, identifying a maximum point of the linguolabial edge curve along a Y axis associated with the linguolabial reference plane; and for mandibular teeth, identifying a minimum point of the linguolabial edge curve along the Y axis associated with the linguolabial reference plane; determining the tooth axis by rotating the guide axis around Z axis associated with the linguolabial reference plane until it matches the linguolabial edge point on the linguolabial plane.

According to a third broad aspect of the present technology, there is provided a system for determining a center of resistance point of a tooth for orthodontic treatment planning. The system comprises a processor arranged to execute a method. The method comprises: receiving image data associated with a tooth crown of a patient; determining a tooth mesh from the image data, the tooth mesh representative of a surface of the tooth crown; identifying an internal reference point in the image data, the internal reference point being based on a predetermined internal reference point instruction for locating the internal reference point in a given tooth crown; determining a reference plane in the image data, the reference plane crossing the internal reference point and the tooth mesh and being based on a predetermined reference plane instruction for locating the reference plane relative to the internal reference point for a given tooth; determining an intersection curve based on an intersection of the reference plane and the tooth mesh, the intersection curve following a shape of the surface of the crown at the reference plane; determining a tooth axis of the tooth crown based on the intersection curve; determining a crown height of the tooth crown based on the tooth axis; and determining the center of resistance of the tooth based on the determined crown height and the determined tooth axis.

According to a fourth broad aspect of the present technology, there is provided a system for determining a center of resistance point of a tooth for orthodontic treatment planning. The system comprises a processor arranged to execute a method. The method comprises: obtaining a tooth mesh from image data associated with a tooth crown of a patient, the tooth mesh representative of a surface of the tooth crown; identifying an internal reference point in the image data, the internal reference point being a mesiodistal center of the tooth crown, the identifying the internal reference point comprising: obtaining a mesial point on a mesial side of the tooth crown, and a distal point on a distal side of the tooth crown, generating a mesiodistal line joining the mesial point and the distal point; identifying the mesiodistal center as a midpoint on the mesiodistal line; determining a reference plane in the image data, the reference plane being perpendicular to the mesiodistal line and extending through the mesiodistal center; determining an intersection curve based on an intersection of the reference plane and the tooth mesh, the intersection curve following a shape of the surface of the crown at the reference plane; determining a tooth axis of the tooth crown based on the intersection curve; determining a crown height of the tooth crown based on the tooth axis; and determining the center of resistance of the tooth based on the determined crown height and the determined tooth axis.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Certain aspects and embodiments of the present technology are directed to methods of and systems for determining a center of resistance (CR) point for a given tooth of a patient receiving (or soon to receive) an orthodontic treatment. An accurate determination of the CR point may further allow for a more accurate modelling of forces imposed on the given tooth in the course of the orthodontic treatment, which is believed to improve planning aspects thereof, such as expected efficacy and effectiveness in achieving respective treatment objectives (alignment of the given tooth, for example).

Further, it should be expressly understood that, in the context of the present specification, the term "orthodontic treatment" is broadly referred to as any type of medical intervention aimed at correcting malocclusions associated with the patient, including surgical and non-surgical manipulations, such as, but not limited to, using aligners. Further, the orthodontic treatment, as referred to herein, may be determined by a professional practitioner in the field of dentistry (such as an orthodontist, a maxillofacial surgeon, for example), or automatically by a specific software, based on respective image data and input parameters associated with the patient.

More specifically, certain aspects and embodiments of the present technology comprise a computer-implemented method for determining a tooth axis (also referred to herein as a "long axis") for the given tooth represented by its crown portion; and further, determining the CR point on the tooth axis using certain reference data indicative of dimensions of the given tooth.

Certain non-limiting embodiments of the present technology minimize, reduce or avoid some of the problems noted in association with the prior art. For example, by implementing certain embodiments of the present technology in respect of determining the CR point for the given tooth, the following advantages may be obtained: a more efficient and accurate approach to modelling movements of the given tooth during the orthodontic treatment. This is achieved in certain non-limiting embodiments of the present technology by determining the tooth axis for the given tooth using image data only of the crown portion thereof, without the need for considering the root portion thereof, which would require obtaining and processing additional image data associated with the patient, such as CT and/or magnetic resonance scans or panoramic radiographs, for example. In this regard, methods and systems provided herein, according to certain non-limiting embodiments of the present technology, allow achieving a higher accuracy in planning and predictability of orthodontic treatments, and consequently, resolving malocclusions more efficiently and effectively whilst minimizing the image data to be obtained from the patient and processed by a processor.

Biomechanics of Tooth Movements

Figures 1, 2:
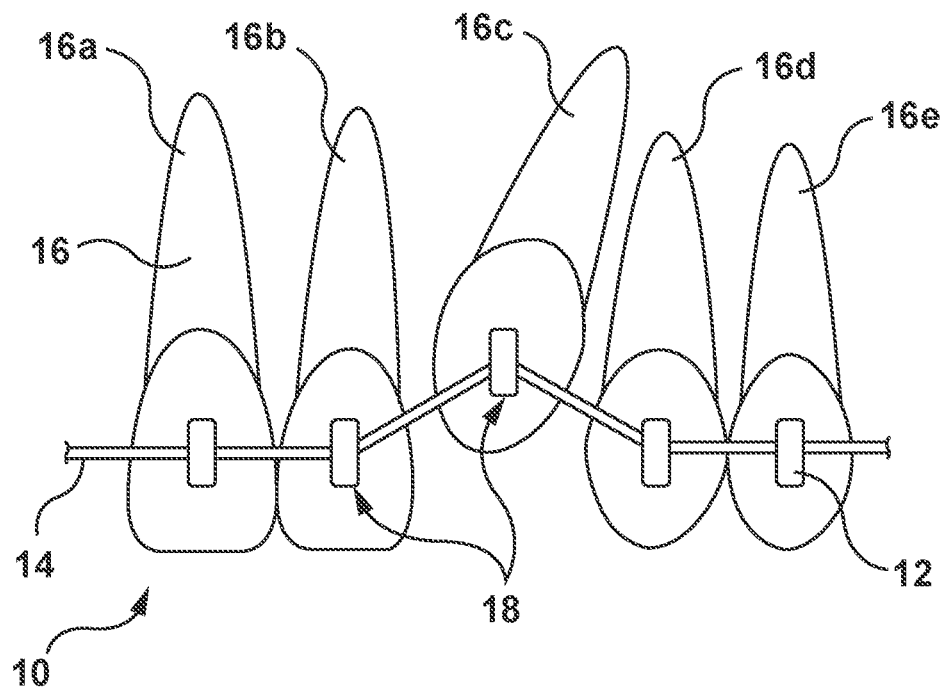
FIG. 1 depicts a schematic diagram of an orthodontic appliance attached to five teeth of a plurality of teeth of a subject.
FIG. 2 depicts a schematic diagram of an upper arch form of the subject of FIG. 1 showing the orthodontic appliance of FIG. 1 attached thereto.

Referring initially to FIGS. 1 and 2, there is depicted an example orthodontic appliance 10 as part of the orthodontic treatment, to which aspects and embodiments of the present technology can be applied. Generally speaking, the orthodontic appliance 10 comprises brackets 12 and an archwire 14. The archwire 14 is made of a shape memory alloy such as Nitinol™, but can also be made of any other shape memory alloy or material having certain elasticity properties. The brackets 12 are respectively provided on some of upper teeth 16 (depicted individually as 16a, 16b, 16c, 16d, and 16e), and the archwire 14 extends between, and is connected to, each of the brackets 12. In the depicted embodiments of FIG. 1, the orthodontic treatment is aimed at misalignment of the tooth 16c; hence the orthodontic appliance 10 is configured to cause the tooth 16c to move in a predetermined direction (such as downwardly) for alignment thereof with neighbouring ones of the upper teeth 16, that is teeth 16a, 16b, 16d, and 16e.

As it can be appreciated, the archwire 14 of FIG. 1 has bends 18, which will gradually move towards an aligned position when installed in a mouth of a subject (also referred to herein as a "patient", not depicted) due to the shape memory effect of the archwire 14, which imposes a given force on the tooth 16c at a respective one of the brackets 12 of the orthodontic appliance 10.

With reference to FIG. 2, as one non-limiting example, the orthodontic appliance 10 has been applied to all the upper teeth 16 of an upper arch form 20 of the subject, with the brackets 12 being attached to an internal surface 22 of the upper teeth 16. However, it should be noted that, in another non-limiting example, the orthodontic appliance 10 may be configured to be installed on an external surface 24 of the upper teeth 16.

It is contemplated that, according to some non-limiting embodiments of the present technology, the orthodontic appliance 10 may comprise orthodontic appliances of different types, shapes, sizes and configurations, such as, without limitation, multi-strand wires, strips, retainers, and plates. Furthermore, the bends 18 in the archwire 14 may comprise rounded corners or loops. It will also be appreciated that the orthodontic appliance 10 may be used for treating any type of teeth misalignment or malocclusion, including but not limited to closing gaps ("space closure"), creating/widening gaps, tooth rotation, tooth intrusion/extrusion, and translation, to name a few.

However, before applying the given force on the tooth 16c, a magnitude and a direction thereof should be accurately calculated, thereby modelling the respective movements of the tooth 16c, to ensure the tooth 16c, during the orthodontic treatment, will be moving towards the aligned position.

More specifically, according to some non-limiting embodiments of the present technology, the modelling of the movements of the tooth 16c under the given force may be implemented based on determining a position of a line of action of the given force relative to a center of resistance (CR) point of the tooth 16c.

In the context of the present specification, the term "CR point" of a given body is broadly referred to as a point, at which imposing a given mechanical force results in a translational movement (or otherwise, a bodily movement) of the given body in a direction of the given mechanical force, along a line of action thereof. As used herein, the CR point is mostly determined for restrained bodies, such as teeth (for example, the tooth 16c), and, in a sense, may be considered as an equivalent to a center of gravity point (center of mass point) for unrestrained (free) bodies.

Further, the non-limiting embodiments of the present technology have been developed based on a premise that the CR point for the tooth 16c (such as a CR point 40 depicted in FIG. 3) can typically be found on a tooth axis associated therewith (such as a tooth axis 42). In the context of the present specification, the term "tooth axis" of the given tooth is referred to as a line extending through the given tooth lengthwise, through a crown portion and a root portion thereof, around which mass of the given tooth as well as anatomical features (such as lobes, developmental grooves, and marginal ridges thereof, for example) thereof are distributed substantially symmetrically.

Figure 3:
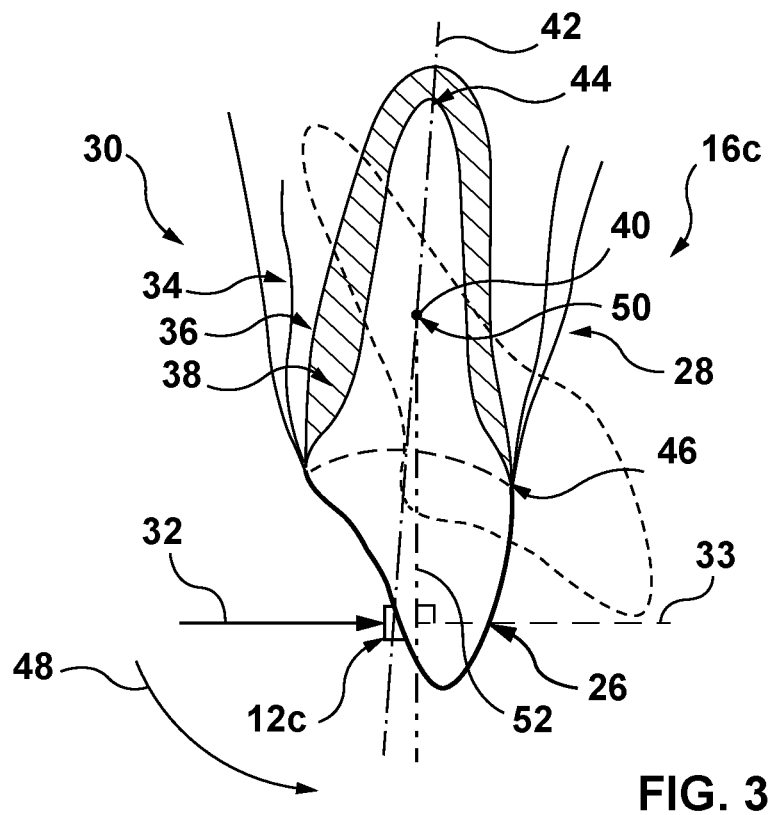
FIG. 3 depicts a schematic diagram of modelling uncontrolled tipping tooth movements of one of the plurality of teeth of the subject of FIG. 1, in accordance with certain embodiments of the present technology.

With reference to FIG. 3, there is depicted a schematic diagram of a distal view of the tooth 16c illustrating an example of modelled movements from a force 32 applied thereon, in accordance with certain non-limiting embodiments of the present technology.

As it can be appreciated, the tooth 16c includes a crown portion 26 and a root portion 28. Tissues of a periodontium 30 surrounding and supporting the upper teeth 16, and the tooth 16c, in particular, include a gingiva 34, an alveolar bone 36, and a periodontal ligament 38. The periodontal ligament 38 surrounds the root portion 26 and attaches the tooth 16c to the alveolar bone 36. Thus, it can be said that the tooth 16c is restrained in the alveolar bone 36 by forces (not separately depicted) from the periodontal ligament 38 and the neighboring upper teeth 16 (depicted in FIGS. 1 and 2). As such, a location of the CR point 40 on the tooth axis 42 may vary depending on a number of roots of the tooth 16c, a length of the root portion 28, and a level (height) of the alveolar bone 36.

Thus, for example, it may be shown that in certain subjects the CR point 40 can be determined to be located on the tooth axis 42 at a length from 24 to 35% of a length of the root portion 28 apically (towards an apex 44 of the tooth 16c) from an alveolar crest 46 of the alveolar bone 36.

Accordingly, using a bracket 12c of the brackets 12 installed on the crown portion 26, the force 32 may be imposed on the tooth 16c. Consequently, under the force 32, the tooth 16c deforming the periodontal ligament 38 may move towards the aligned position. As previously noted, the dynamics of the movements of the tooth 16c, as it moves towards the aligned position, can be said to be defined by the direction and the magnitude of the force 32. To that end, the direction and the magnitude of the force 32 imposed on the tooth 16*c* may be determined by a particular configuration of the orthodontic appliance 10 and components thereof, that is, the brackets 12 and the archwire 14, which includes, without being limited to, a material of the archwire 14 and elasticity properties associated therewith, a thickness of the archwire 14, a configuration of a given one of the brackets 12 defining a method for installing the archwire 14 therein, and the like. Further, it should be expressly understood that the force 32 is depicted in FIG. 3 as a single force only for the sake of clarity of the present description, and may comprise a superposition of a system of forces applied to the tooth 16*c* at the bracket 12*c* as well as at other components (not separately depicted) of the orthodontic appliance 10 installed thereon such as springs, ligatures, coils, anchors, and the like.

Further, as the force 32 is applied to the crown portion 26 with a line of action 33 thereof not extending through the CR point 40, it may typically create a torque 48. Accordingly, such an application of the force 32 may cause the tooth 16*c* to move (1) translationally, as if the force 32 is applied to the CR point 40; and (2) rotationally around a center of rotation 50. It should be noted that, akin to the force 32, the torque 48 may be a resultant force torque of a torque system influencing the tooth 16*c* caused by the force 32. In this regard, the torque 48 may be determined in accordance with the following equation:

$$T = F \times D, \quad (1)$$

where T is the torque 48,

F is the force 32, and

D is a distance 52, over a perpendicular, between the CR point 40 and the line of action 33.

Practically speaking, a particular movement of the tooth 16*c* may be projected by varying a torque-to-force ratio T:F between the torque 48 and the force 32. To that end, as it can be appreciated from Equation (1), after applying the force 32 of a given magnitude, a magnitude of the torque 48 may be varied by varying the distance 52 from the line of action 33 to the CR point 40. Thus, the longer the distance 52, the higher the torque-to-force ratio T:F.

Thus, in one non-limiting example, in certain subjects, when the ratio T:F is 0:1, the tooth 16*c* will move purely rotationally with the center of rotation 50 substantially coinciding with the CR point 40. To that end, the crown portion 26 will be moving labially (buccally) and the apex 44 will be moving lingually. Such a movement can also be referred to as an uncontrolled tipping tooth movement.

Figure 4:
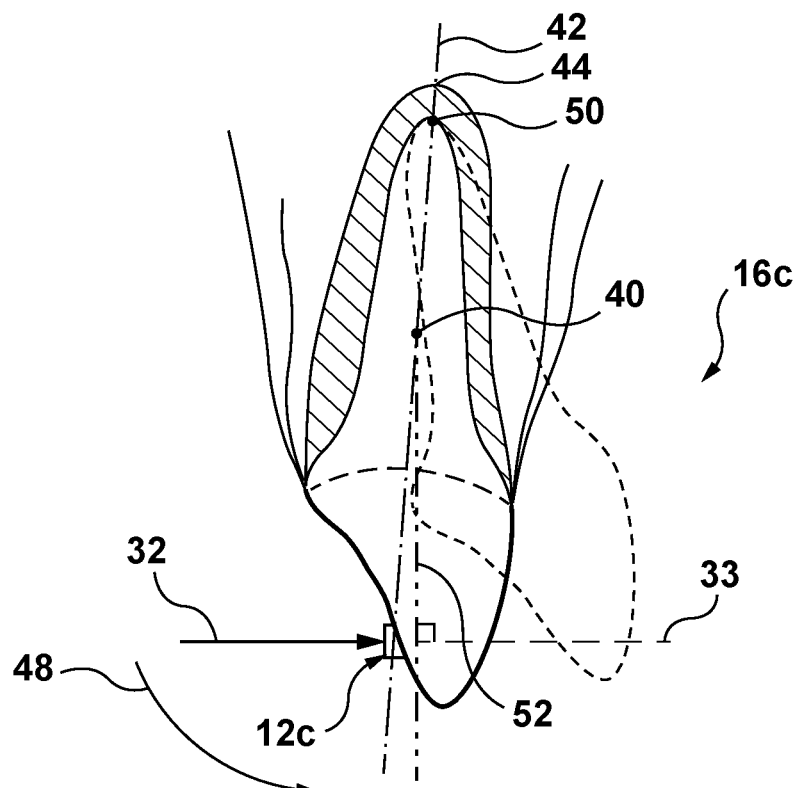
FIG. 4 depicts a schematic diagram of modelling controlled tipping tooth movements of the one of the plurality of teeth of the subject of FIG. 1, in accordance with certain embodiments of the present technology.

With reference to FIG. 4, there is depicted a schematic diagram of the distal view of the tooth 16*c* illustrating another example of modelled movements from the force 32 applied thereon, in accordance with some non-limiting embodiments of the present technology.

In the depicted embodiments of FIG. 4, the torque-to-force ratio T:F is between 5:1 and 7:1, which causes the center of rotation 50 to shift towards the apex 44, in certain subjects. To that end, the force 32 causes the tooth 16*c* to move as a "pendulum" around the apex 44. By varying the ratio T:F within a predetermined range, it is possible to produce similar movements of the tooth 16*c* based on respective locations of the center of rotation 50 near the apex 44, each of these movements can be referred to as a controlled tipping tooth movement.

Figure 5:
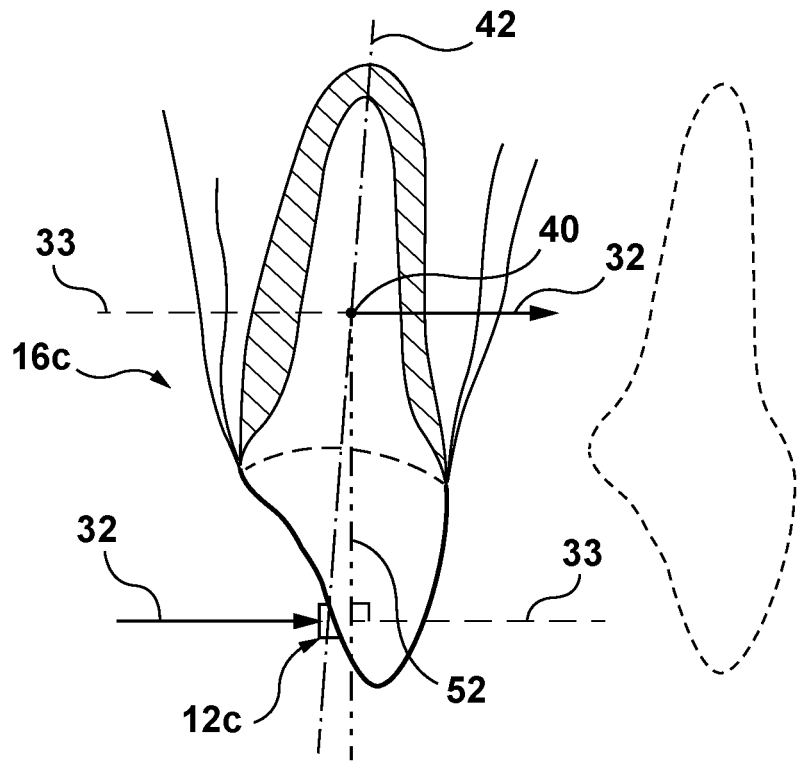
FIG. 5 depicts a schematic diagram of modelling translational tooth movements of the one of the plurality of teeth of the patient of subject of FIG. 1, in accordance with certain embodiments of the present technology.

With reference to FIG. 5, there is depicted a schematic diagram of the distal view of the tooth 16*c* illustrating yet another example of modelled movements from the force 32 applied thereon, in accordance with some non-limiting embodiments of the present technology.

In the depicted embodiments of FIG. 5, the torque-to-force ratio T:F is around 10:1, which causes the center of rotation 50 to shift to infinity. Accordingly, with such a value of the torque-to-force ratio T:F, the torque 48 can be said to cause the line of action 33 of the force 32 to extend through the CR point 40, thereby causing the tooth 16*c*, in certain subjects, to move purely translationally therealong. Such movements can also be referred to as bodily tooth movements.

Some non-limiting examples of the bodily tooth movements of the tooth 16*c* may also include an extrusion tooth movement and an intrusion tooth movement (not separately depicted) where the force 32 is directed along the tooth axis 42 through the CR point 40 downwards or upwards, respectively.

Figure 6:
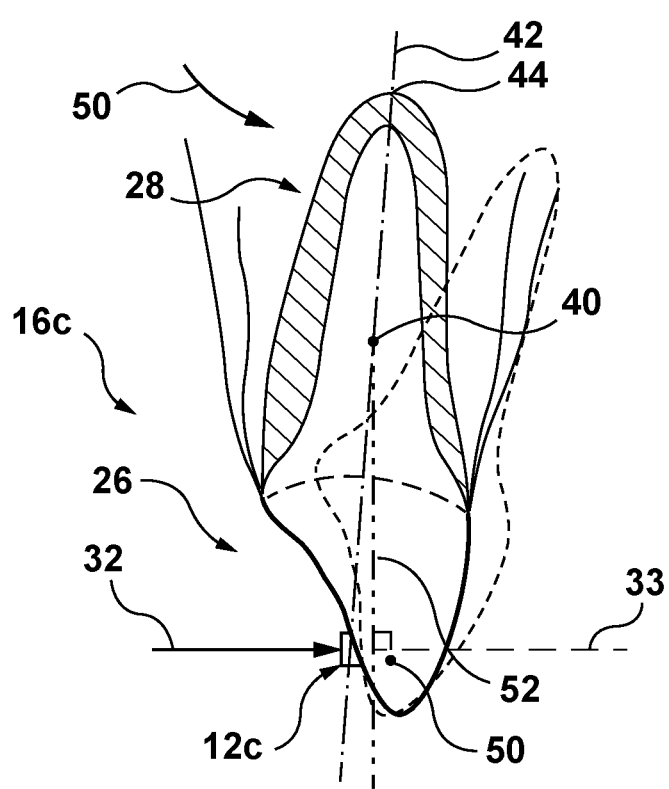
FIG. 6 depicts a schematic diagram of modelling root uprighting tooth movements of the one of the plurality of teeth of the subject of FIG. 1, in accordance with certain embodiments of the present technology.

Finally, with reference to FIG. 6, there is depicted a schematic diagram of the distal view of the tooth 16*c* illustrating yet another example of modelled movements from the force 32 applied thereon, in accordance with some non-limiting embodiments of the present technology.

As it can be appreciated, when the torque-to-force ratio T:F is further increased to values such as 14:1, for example, the center or rotation 50 may be shifted to the crown portion 26, thereby causing the tooth 16*c* to rotate around the crown portion 26. To that end, the apex 44 of the root portion 28 moves buccally, which can be referred to as a root uprighting tooth movement.

Thus, it is contemplated that, based on a current position of the tooth axis 42 relative to the crown portion 26, respective values of the force 32 and the torque 48 needed to cause the tooth 16*c* to move towards the aligned position may be determined. Further, in those embodiments of the present technology where the orthodontic treatment for the subject is generated based on image data associated only with the crown portion 26, the tooth axis 42 may be used to determine a position of the root portion 28 relative to the crown portion 26.

As it can be apparent from the description above, at least some of the so modelled tooth movements may be used to plan the orthodontic treatment for the subject to cause the tooth 16*c* to move towards the aligned position. Accordingly, an accurate determination of the tooth axis 42 and the CR point 40 thereon may further allow for a more accurate planning of the orthodontic treatment for the subject aimed at mitigating the probability of discrepancies between planned tooth movements and actual tooth movements in the course of the orthodontic treatment. How the tooth axis 42 and the CR point 40 can be determined for the tooth 16*c*, in accordance with the non-limiting embodiments of the present technology, will be described below with reference to FIGS. 9 to 18.

System

Figure 7:
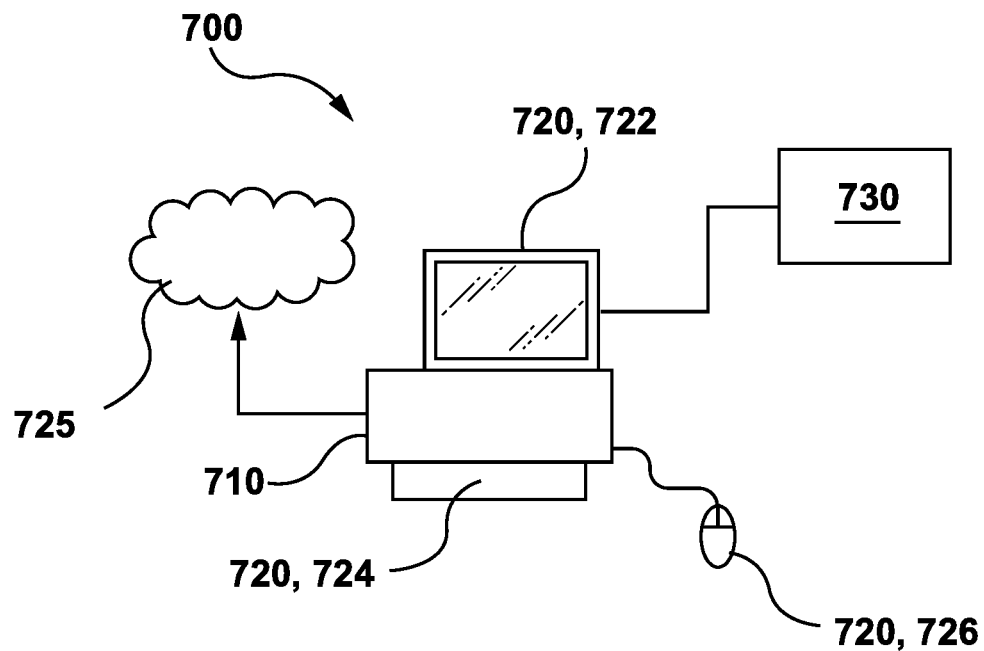
FIG. 7 depicts a schematic diagram of a system for planning an orthodontic treatment for the subject of FIG. 1 based on determining a center of resistance (CR) point for the one of the plurality of teeth present in FIG. 1, in accordance with certain embodiments of the present technology.
Figure 8:
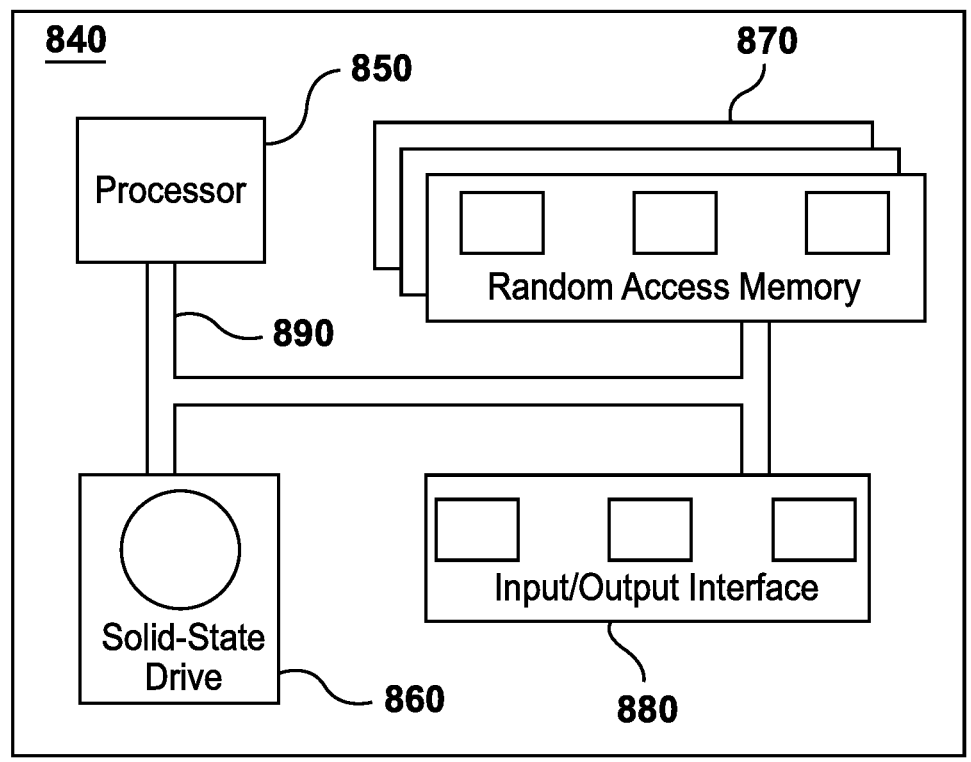
FIG. 8 depicts a schematic diagram of a computing environment of the system of FIG. 7, in accordance with certain embodiments of the present technology.

Now, with reference to FIGS. 7 to 8, there is depicted a schematic diagram of a system 700 suitable for determining the tooth axis 42 and further the CR point 40 thereon, in accordance with some non-limiting embodiments of the present technology.

It is to be expressly understood that the system 700 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 700 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 700 may provide in certain instances simple implementations of the present technology, and that where such is the case they have been presented in this manner as an aid to understanding. As persons skilled in the art would understand, various implementations of the present technology may be of a greater complexity.

In certain non-limiting embodiments of the present technology, the system 700 of FIG. 7 comprises a computer system 710. The computer system 710 is configured, by pre-stored program instructions, to determine the tooth axis 42 and further the CR point 40 thereon, based on image data associated with the subject, according to the non-limiting embodiments of the present technology.

To that end, in some non-limiting embodiments of the present technology, the computer system 710 is configured to receive image data pertaining to the subject or to a given orthodontic treatment. The computer system 710 may use the image data for determining the tooth axis 42. According to some non-limiting embodiments of the present technology, the computer system 710 may receive the image data via local input/output interface (such as USB, as an example, not separately depicted). In other non-limiting embodiments of the present technology, the computer system 710 may be configured to receive the image data over a communication network 725, to which the computer system 710 is communicatively coupled.

In some non-limiting embodiments of the present technology, the communication network 725 is the Internet and/or an Intranet. Multiple embodiments of the communication network may be envisioned and will become apparent to the person skilled in the art of the present technology. Further, how a communication link between the computer system 710 and the communication network 725 is implemented will depend, inter alia, on how the computer system 710 is implemented, and may include, but is not limited to, a wire-based communication link and a wireless communication link (such as a Wi-Fi communication network link, a 3G/4G communication network link, and the like).

It should be noted that the computer system 710 can be configured for receiving the image data from a vast range of devices. Some such devices can be used for capturing and/or processing data pertaining to maxillofacial and/or cranial anatomy of a subject. In certain embodiments, the image data received from such devices is indicative of properties of anatomical structures of the subject, including: teeth, intraoral mucosa, maxilla, mandible, temporomandibular joint, and nerve pathways, among other structures. In some embodiments, at least some of the image data is indicative of properties of external portions of the anatomical structures, for example dimensions of a gingival sulcus, and dimensions of an external portion of a tooth (e.g., a crown of the tooth) extending outwardly of the gingival sulcus. In some embodiments, the image data is indicative of properties of internal portions of the anatomical structures, for example volumetric properties of bone surrounding an internal portion of the tooth (e.g., a root of the tooth) extending inwardly of the gingival sulcus. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics. In some embodiments, the image data includes datasets generally intended for the practice of periodontics.

The image data may include two-dimensional (2D) data and/or three-dimensional data (3D). In certain embodiments, the image data includes at least one dataset derived from one or more of the following imaging modalities: computed tomography (CT), radiography, magnetic resonance imaging, ultrasound imaging, nuclear imaging and optical imaging. Any medical imaging modality is included within the scope of the present technology. In certain non-limiting embodiments of the present technology, the image data includes 2D data, from which 3D data may be derived, and vice versa.

In alternative non-limiting embodiments of the present technology, the computer system 710 may be configured to receive the image data associated with the subject directly from an imaging device 730 communicatively coupled thereto. Broadly speaking the imaging device 730 may be configured (for example, by a processor 850 depicted in FIG. 8) to capture and/or process the image data of the upper teeth 16 and the periodontium 30 of the subject. In certain non-limiting embodiments of the present technology, the image data may include, for example, one or more of: (1) images of external surfaces of respective crown portions (such as the crown portion 26 of the tooth 16*c*) of the upper teeth 16, (2) images of an external surface of the periodontium 30 including those of the gingiva 34, the alveolar bone 36, and images of blood vessels and nerve pathways associated with the upper teeth 16; and (3) images of an oral region. By doing so, the imaging device 730 may be configured, for example, to capture image data of the upper arch form 20 of the subject. In another example, the imaging device may also be configured to capture and/or process image data of a lower arch form (such as the lower arch form 21 depicted in FIG. 9) associated with the subject without departing from the scope of the present technology.

In some non-limiting embodiments of the present technology, the imaging device 730 may comprise an intra-oral scanner enabling to capture direct optical impressions of the upper arch form 20 of the subject.

In a specific non-limiting example, the intraoral scanner can be of one of the types available from MEDIT, corp. of 23 Goryeodae-ro 22-gil, Seongbuk-gu, Seoul, Korea. It should be expressly understood that the intraoral scanner can be implemented in any other suitable equipment.

In other non-limiting embodiments of the present technology, the imaging device 730 may comprise a desktop scanner enabling to digitize a mold representing the upper arch form 20. In this regard, the mold may have been obtained via dental impression using a material (such as a polymer, e.g. polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica.

In a specific non-limiting example, the desktop scanner can be of one of the types available from Dental Wings, Inc. of 2251, ave Letourneux, Montreal (QC), Canada, H1V 2N9. It should be expressly understood that the desktop scanner can be implemented in any other suitable equipment.

Further, it is contemplated that the computer system 710 may be configured for processing of the received image data. The resulting image data of the upper teeth 16 received by the computer system 710 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology. For implementing functions described above, the computer system 710 may further comprise a corresponding computing environment.

With reference to FIG. 8, there is depicted a schematic diagram of a computing environment 840 suitable for use with some implementations of the present technology. The computing environment 840 comprises various hardware components including one or more single or multi-core processors collectively represented by the processor 850, a solid-state drive 860, a random access memory 870 and an input/output interface 880. Communication between the various components of the computing environment 840 may be enabled by one or more internal and/or external buses 890 (e.g. a PCI bus, universal serial bus, IEEE 1394 "Firewire" bus, SCSI bus, Serial-ATA bus, ARINC bus, etc.), to which the various hardware components are electronically coupled.

The input/output interface 880 allows enabling networking capabilities such as wire or wireless access. As an example, the input/output interface 880 comprises a networking interface such as, but not limited to, a network port, a network socket, a network interface controller and the like. Multiple examples of how the networking interface may be implemented will become apparent to the person skilled in the art of the present technology. For example, but without being limiting, the input/output interface 880 may implement specific physical layer and data link layer standard such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 860 stores program instructions suitable for being loaded into the random access memory 870 and executed by the processor 850, according to certain aspects and embodiments of the present technology. For example, the program instructions may be part of a library or an application.

In these embodiments, the computing environment 840 is implemented in a generic computer system which is a conventional computer (i.e. an "off the shelf" generic computer system). The generic computer system may be a desktop computer/personal computer, but may also be any other type of electronic device such as, but not limited to, a laptop, a mobile device, a smart phone, a tablet device, or a server.

As persons skilled in the art of the present technology may appreciate, multiple variations as to how the computing environment 840 is implemented may be envisioned without departing from the scope of the present technology.

Referring back to FIG. 7, the computer system 710 has at least one interface device 720 for providing an input or an output to a user of the system 700, the interface device 720 being in communication with the input/output interface 880. In the embodiment of FIG. 7, the interface device is a screen 722. In other non-limiting embodiments of the present technology, the interface device 720 may be a monitor, a speaker, a printer or any other device for providing an output in any form such as image-form, written form, printed form, verbal form, 3D model form, or the like.

In the depicted embodiments of FIG. 7, the interface device 720 also comprises a keyboard 724 and a mouse 726 for receiving input from the user of the system 700. Other interface devices 720 for providing an input to the computer system 710 can include, without limitation, a USB port, a microphone, a camera or the like.

The computer system 710 may be connected to other users, such as through their respective clinics, through a server (not depicted). The computer system 710 may also be connected to stock management or client software which could be updated with stock when the orthodontic treatment has been determined and/or schedule appointments or follow-ups with clients, for example.

Image Data

As previously alluded to, according to the non-limiting embodiments of the present technology, the processor 850 may be configured to: (1) receive the image data associated with the subject's teeth (such as the upper teeth 16); (2) based on the received image data, determine, for each of the upper teeth 16, a respective tooth axis (such as the tooth axis 42 of the tooth 16c); and (3) determine a respective CR point on each of the tooth axes (such the CR point 40).

According to some non-limiting embodiments of the present technology, the processor 850 may be configured to receive 3D models of arch forms of the subject.

Figure 9:
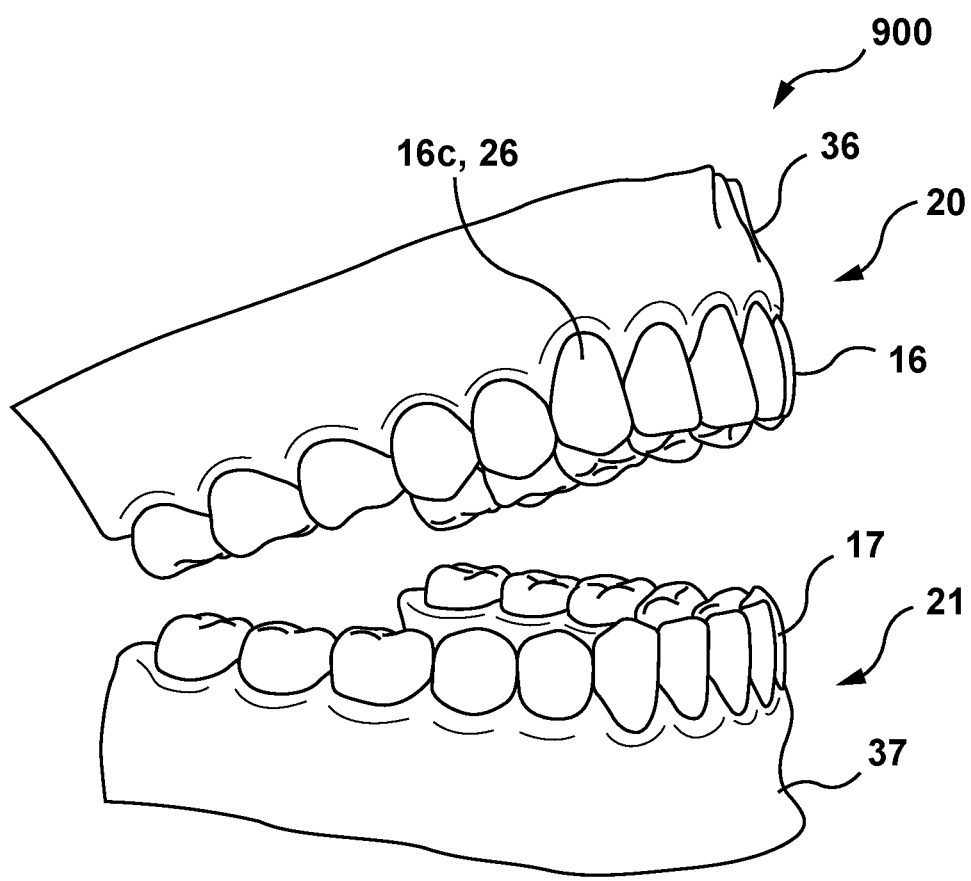
FIG. 9 depicts a perspective view of a 3D model of the upper arch form and a lower arch form of the patient of FIG. 1, in accordance with the non-limiting embodiments of the present technology.

With reference to FIG. 9, there is depicted a perspective view of a 3D model 900 representing a current configuration of the upper arch form 20 (also referred to herein as "maxillary arch form") and the lower arch form 21 (also referred to herein as "mandibular arch form") of the subject, in accordance with the non-limiting embodiments of the present technology.

According to the non-limiting embodiments of the present technology, the upper arch form 20 comprises the upper teeth 16 (also referred to herein as "maxillary teeth") and the gingiva 36, and the lower arch form 21 comprises lower teeth 17 (also referred to herein as "mandibular teeth") and lower gingiva 37. As it can be appreciated, the upper teeth 16 and the lower teeth 17 are represented, in the 3D model 900, by respective crown portions associated therewith.

In some non-limiting embodiments of the present technology, after receiving the 3D model 900, the processor 850 may be configured to segment thereon crown portions associated with the respective teeth from each other as well as from an associated gingiva, thereby generating a plurality of so segmented crown portions associated with one of the upper arch form 20 and the lower arch form 21 of the subject. To that end, according to some non-limiting embodiments of the present technology, the processor 850 may be configured to apply one or more approaches to automatic tooth segmentation, for example, one, which is described in a co-owned U.S. patent application Ser. No. 16/703,471, entitled "METHOD AND SYSTEM FOR DENTAL BOUNDARY DETERMINATION"; the content of which is hereby incorporated by reference in its entirety.

Although the description below will be given in respect of the upper teeth 16 for the sake of clarity and simplicity thereof, and in no way as a limitation, it should be expressly understood that the non-limiting embodiments of the present technology may also apply to the lower teeth 17 with certain alterations, which will be explicitly indicated below where necessary.

Thus, for example, the processor 850 may be configured to generate a 3D crown model for a given one of the upper teeth 16 (such as the crown portion 26 of the tooth 16c) representative of a surface thereof.

The non-limiting embodiments of the present technology have been developed based on a premise that the upper teeth 16 should be considered in certain groups, into which they may be divided based on common parameters associated therewith. These parameters may include certain surface features of an associated crown portion (such as curvature in a distal projection, for example) and anatomical features (such as a number of cusps of an associated crown portion or a number of roots in an associated root portion) of the given one of the upper teeth 16. In this regard, the developers have realized that the determination of a given tooth axis for premolars and molars can be different from that for incisors and canines, thereby dividing the upper teeth 16 into a first group and a second group, respectively.

Thus, depending on which of the first group or the second group the tooth 16c is associated with, the processor 850 can be configured to generate different 3D crown models of the crown portion 26.

Figure 10:
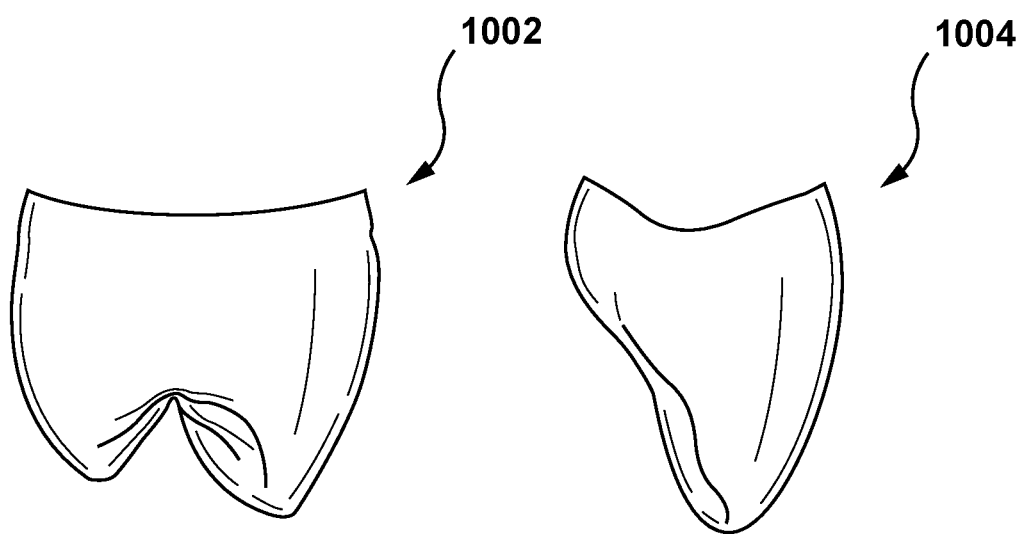
FIG. 10 depicts respective distal views of a first 3D crown model and a second 3D crown model of a crown portion associated with the one of the plurality of teeth present in FIG. 1 used by a processor of FIG. 8 for determining a tooth axis therefor, in accordance with the non-limiting embodiments of the present technology.

With reference to FIG. 10, there is depicted a distal view of a first 3D crown model 1002 of the crown portion 26; and a second 3D crown model 1004 of the crown portion 26, in accordance with certain non-limiting embodiments of the present technology. Each of the first 3D crown model 1002 and the second 3D crown model 1004 has been segmented, by the processor, from the 3D model 900.

Thus, the description below will be provided in light of two scenarios: in Scenario 1, there will be described implementations of certain non-limiting embodiments of the present technology in respect of the first 3D crown model 1002; whereas in Scenario 2, there will be described those in respect of the second 3D crown model 1004.

Determining Crown Curvature

According to the non-limiting embodiments of the present technology, the processor 850 may be configured to determine the tooth axis 42 based on analyzing certain aspects of crown curvature of the crown portion 26. To that end, the processor 850 may be configured to determine an intersection curve of one of the first 3D crown model 1002 and the second 3D crown model 1004 with a mesiodistal plane. This section equally applies to both Scenario 1 and Scenario 2.

Figure 11:
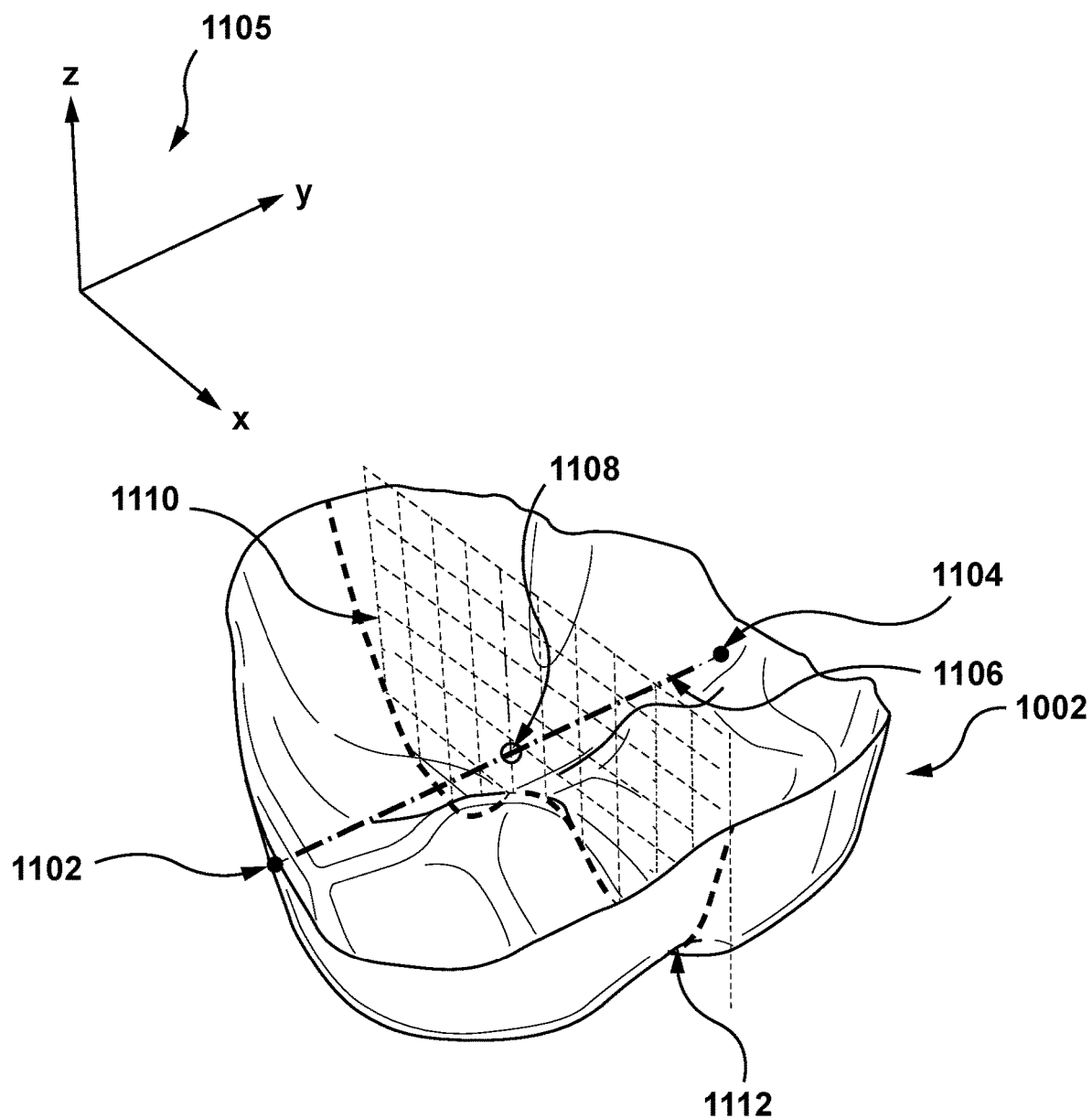
FIG. 11 depicts a perspective view of one of the first 3D crown model and the second 3D crown model of FIG. 10 dissected by a mesiodistal plane for determining an intersection curve used by then processor of FIG. 8 for determining the tooth axis for the one of the plurality of teeth present in FIG. 1, in accordance with certain non-limiting embodiments of the present technology.

With reference to FIG. 11, there is depicted a perspective view of the first 3D crown model 1002 dissected by a first mesiodistal plane 1110, according to some non-limiting embodiments of the present technology.

First, according to the non-limiting embodiments of the present technology, the processor 850 may be configured to identify a distal point 1102 and a mesial point 1104 on the 3D crown model 1002.

In some non-limiting embodiments of the present technology, the processor 850 may be configured to identify each of the distal point 1102 and the mesial point 1104 as being highest curvature points on a distal surface and a mesial surface of the first 3D crown model 1002, respectively. In other words, the processor 850 may be configured to identify each of the distal point 1102 and the mesial point 1104 to be indicative of those lying within a contact region (not separately depicted) between the crown portion 26 and crown portions of adjacent ones of the upper teeth 16. To that end, in some non-limiting embodiments of the present technology, each of the distal point 1102 and the mesial point 1104 may be identified outside the first 3D crown model 1002.

Further, according to the non-limiting embodiments of the present technology, the processor 850 may be configured to join the distal point 1102 and the mesial point 1104, thereby generating a mesiodistal line 1106 associated with the first 3D crown model 1002. The processor 850 may further be configured to determine, on the mesiodistal line 1106, a reference point 1108 for determining the mesiodistal plane 1110 in accordance with a predetermined rule. For example, the processor 850 may be configured to determine the reference point 1108 based on a position along the mesiodistal line 1106 according to a predetermined ratio between the distal surface and the mesial surface (such as 1:3 or 1:5, for example). In another example, the processor 850 may be configured to determine the reference point 1108 as a projection of certain anatomical specifics of the crown portion 26 indicated by the first 3D crown model 1002, such as cusps or grooves, onto the mesiodistal line 1106.

In specific non-limiting embodiments of the present technology, the processor 850 may be configured to determine the reference point 1108 as a midpoint of the mesiodistal line 1106, which may be referred to herein as a "mesiodistal center" associated with the first 3D crown model 1002.

According to some non-limiting embodiments of the present technology, based on the reference point 1108, the processor 850 may be configured to determine a coordinate system 1105 for the first 3D crown model 1002 assigning its center to the reference point 1108 with a Z axis being perpendicular to the mesiodistal line 1106 and directed upwards. As it can be appreciated, for a 3D crown model of a respective one of the lower teeth 17, an associated Z axis would be directed downwardly.

Further, as it can be appreciated, a Y axis of the coordinate system 1105 may be parallel to the mesiodistal line 1106; and an X axis of the coordinate system 1105 may hence be perpendicular to the mesiodistal line 1106.

Further, the processor 850 may be configured to construct the first mesiodistal plane 1110 to originate in the reference point 1108 and to be perpendicular to the mesiodistal line 1106. Accordingly, in some non-limiting embodiments of the present technology, by doing so, the processor 850 is configured to determine a first intersection curve 1112 between the first 3D crown model 1002 and the first mesiodistal plane 1110.

Generating Guide Axis

According to the non-limiting embodiments of the present technology, the processor 850 may further be configured to generate a so-called guide axis, based on the first intersection curve 1112, for further determining the tooth axis 42.

Scenario 1

Figure 12:
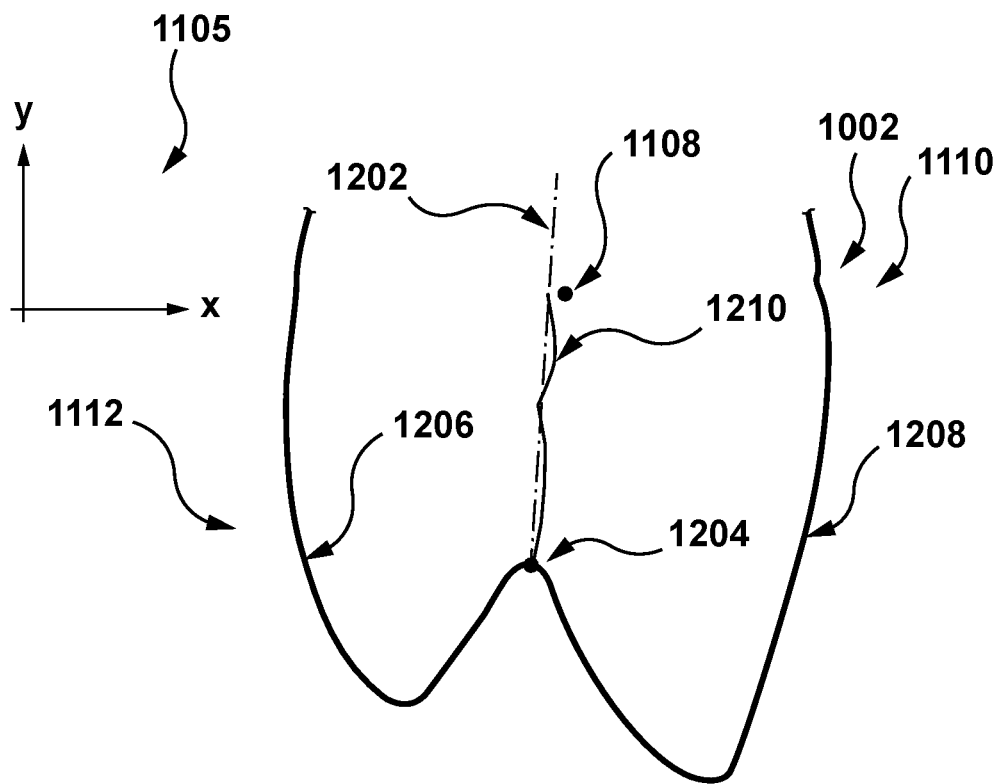
FIG. 12 depicts a cross-sectional mesiodistal view of the first 3D crown model of FIG. 10 used by the processor of FIG. 8 for determining a first guide axis, thereby determining the tooth axis for the one of the plurality of teeth present in FIG. 1, in accordance with certain non-limiting embodiments of the present technology.

With reference to FIG. 12, there is depicted a schematic diagram of a cross-sectional mesiodistal view of the first 3D crown model 1002 produced by the first mesiodistal plane 1110 for generating a first guide axis 1202 associated therewith, according to some non-limiting embodiments of the present technology.

According to some non-limiting embodiments of the present technology, the processor 850 may be configured to generate the first guide axis 1202 based on certain segments of the first intersection curve 1112. To that end, first, the processor 850 may be configured to determine a first separation point 1204 for segmenting the first intersection curve 1112.

According to some non-limiting embodiments of the present technology, the processor 850 may be configured to identify the first separation point 1204 as a point of the first intersection curve 1112, which is closest, within the coordinate system 1105, to the reference point 1108 associated with the first 3D crown model 1002. In other words, the first separation point 1204 may be determined as a point of a highest positive curvature of the first intersection curve 1112. In other non-limiting embodiments of the present technology, the processor 850 may be configured to identify the first separation point 1204 as a median point of the first intersection curve 1112, as an example.

Thus, using the first separation point 1204, the processor 850 may be configured to segment the first intersection curve 1112 into at least a first subcurve 1206 and a second subcurve 1208. Further, the processor 850 may be configured to generate, based on the first subcurve 1206 and the second subcurve 1208, a first average intersection curve 1210. To that end, according to some non-limiting embodiments of the present technology, the processor 850 may be configured to use one or more curve fitting techniques, which may include, without being limited to, one or more of: a linear curve fitting technique, a non-linear curve fitting technique, including, for example, a polynomial curve fitting technique, an exponential curve fitting technique, a logarithmic curve fitting technique, a spline curve fitting technique, and the like.

Further, according to some non-limiting embodiments of the present technology, the processor 850 may be configured to generate the first guide axis 1202 by linearly approximating the first average intersection curve 1210. To that end, the processor 850 may be configured to apply one or more linear curve fitting techniques. Accordingly, in some non-limiting embodiments of the present technology, the first separation point 1204 may lie on the first guide axis 1202.

In specific non-limiting embodiments of the present technology, the applying one or more linear fitting technique may include applying a linear regression algorithm to the average intersection curve 1210.

Scenario 2

Figure 13:
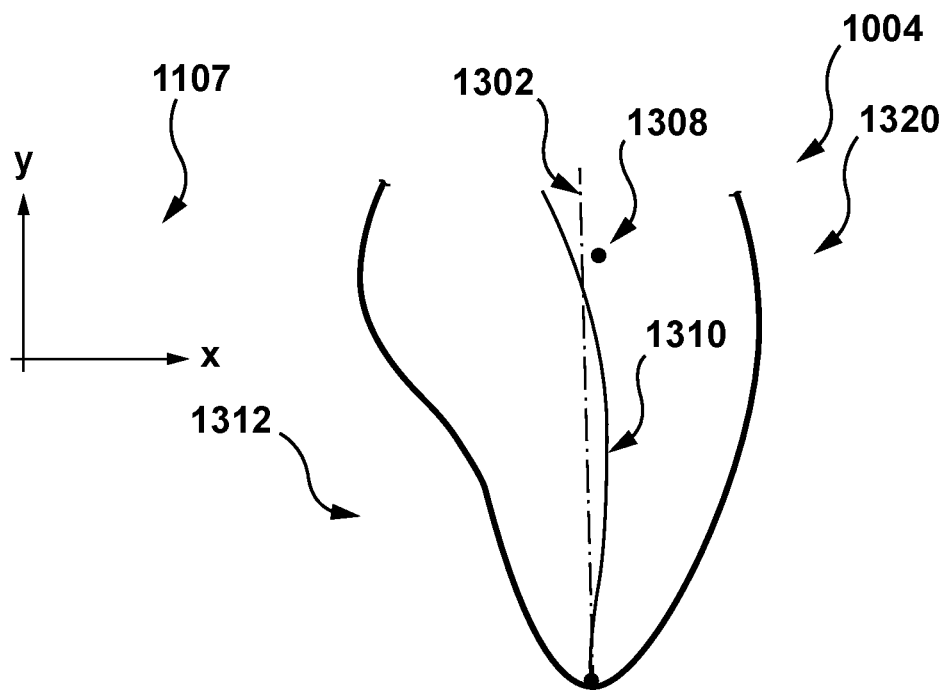
FIG. 13 depicts a cross-sectional mesiodistal view of the second 3D crown model of FIG. 10 used by the processor of FIG. 8 for determining a second guide axis, in accordance with certain non-limiting embodiments of the present technology.

With reference to FIG. 13, there is depicted a cross-sectional mesiodistal view of the second 3D crown model 1004 produced by a second mesiodistal plane 1320 for determining a second guide axis 1302 associated therewith, according to some non-limiting embodiments of the present technology.

As it may become apparent, the processor 850 may have been configured to determine a second reference point 1308, thereby allocating a second coordinate system 1107 for the second 3D crown model 1004 similar to what is described in respect of the reference point 1108 and the coordinate system 1105, respectively. It should be expressly understood that although, generally speaking, the coordinate system 1105 and the second coordinate system 1107 are different, and include different relative angular orientations of associated axes; in some non-limiting embodiments of the present technology, their Z-axes may have the same angular orientation.

Further, the processor 850 may have been configured to generate the second mesiodistal plane 1320, based on the second reference point 1308, thereby forming a second intersection curve 1312, in a similar fashion to that used for generating the first intersection curve 1112.

According to some non-limiting embodiments of the present technology, the processor 850 may be configured to determine a second separation point 1304 as a minimum point of the second intersection curve 1312 along a Z axis of the second coordinate system 1107 associated with the second 3D crown model 1004. As it may further become apparent, a separation point associated with a 3D crown model (not separately depicted) of the respective one of the lower teeth 17 may be identified, by the processor 850, as a maximum point of an associated intersection curve along a Z axis within an associated coordinate system.

Further, according to some non-limiting embodiments of the present technology, using the second separation point 1304, the processor 850 may be configured to segment the second intersection curve 1312 for generating a second average intersection curve 1310, and based thereon, generating the second guide axis 1302 in a similar fashion to that described above in respect of the first guide axis 1202 in Scenario 1.

Determining Tooth Axis

As previously mentioned, based on one of the first guide axis 1202 and the second guide axis 1302, the processor 850 may further be configured to determine the tooth axis 42 associated with the tooth 16c.

Scenario 1

According to some non-limiting embodiments of the present technology, the first guide axis 1202 may define the tooth axis 42 of the tooth 16c.

Thus, it can be said that the processor 850 may be configured to determine the tooth axis 42 of the tooth 16c, based on the first 3D crown model 1002 of the crown portion 26, as a line having been generated based on the first intersection curve 1112 and extending through the first separation point 1204.

Scenario 2

According to some non-limiting embodiments of the present technology, the processor 850 may be configured to determine the tooth axis 42 by determining an angular orientation for the second guide axis 1302 in a linguolabial plane associated with the second 3D crown model 1004.

Figure 14:
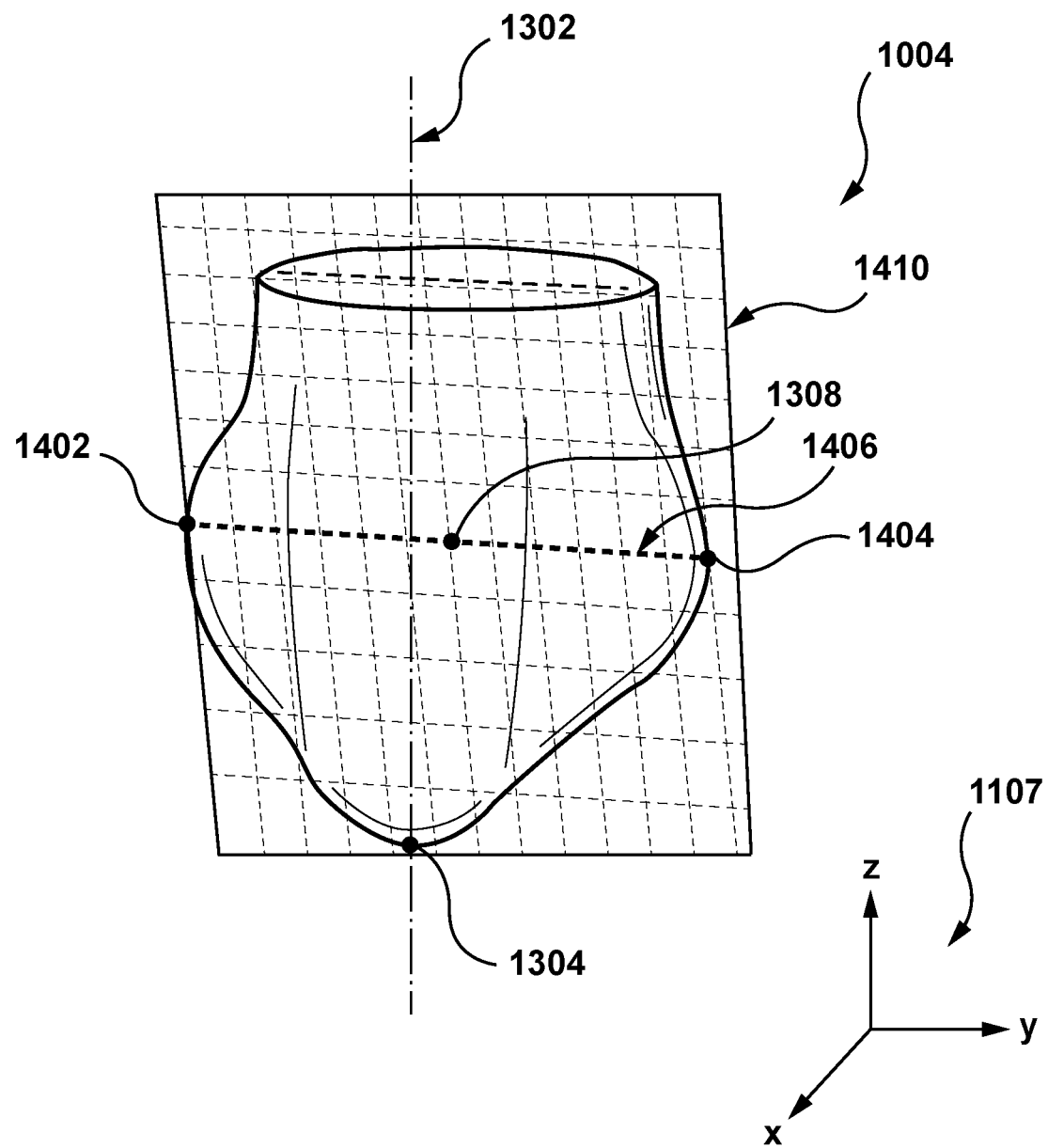
FIG. 14 depicts a labial view of the second 3D crown model of FIG. 10 dissected by a linguolabial plane used by the processor of FIG. 8 for determining a linguolabial edge curve, in accordance with certain non-limiting embodiments of the present technology.

With reference to FIG. 14, there is depicted a labial view of the second 3D crown model 1004 dissected by a linguolabial plane 1410, in accordance with some non-limiting embodiments of the present technology.

As it can be appreciated from FIG. 14, the processor 850 may have been configured to identify a second distal point 1402 and a second mesial point 1404 for the second 3D crown model 1004 in a way similar to that described above in respect of the distal point 1102 and the mesial point 1104. Further, by joining the second distal point 1402 and the second mesial point 1404, the processor 850 may have been configured to generate a second mesiodistal line 1406, and further to generate thereon the second reference point 1308 using one of the respective approaches described above.

According to some non-limiting embodiments of the present technology, the processor 850 may be configured to generate the linguolabial plane 1410 to be parallel to the second mesiodistal line 1406. In other non-limiting embodiments of the present technology, the processor 850 may be configured to generate the linguolabial plane 1410 to be parallel to the second mesiodistal line 1406 and perpendicular to the second mesiodistal plane 1320 (as depicted in FIG. 13).

Thus, by determining a point in the linguolabial plane 1410 to be used for directing the second guide axis 1302 from the second separation point 1304, the processor 850 may further be configured to determine the tooth axis 42. In this regard, according to some non-limiting embodiments of the present technology, the processor 850 may be configured to determine a linguolabial edge curve associated with the second 3D crown model 1004.

Figure 15:
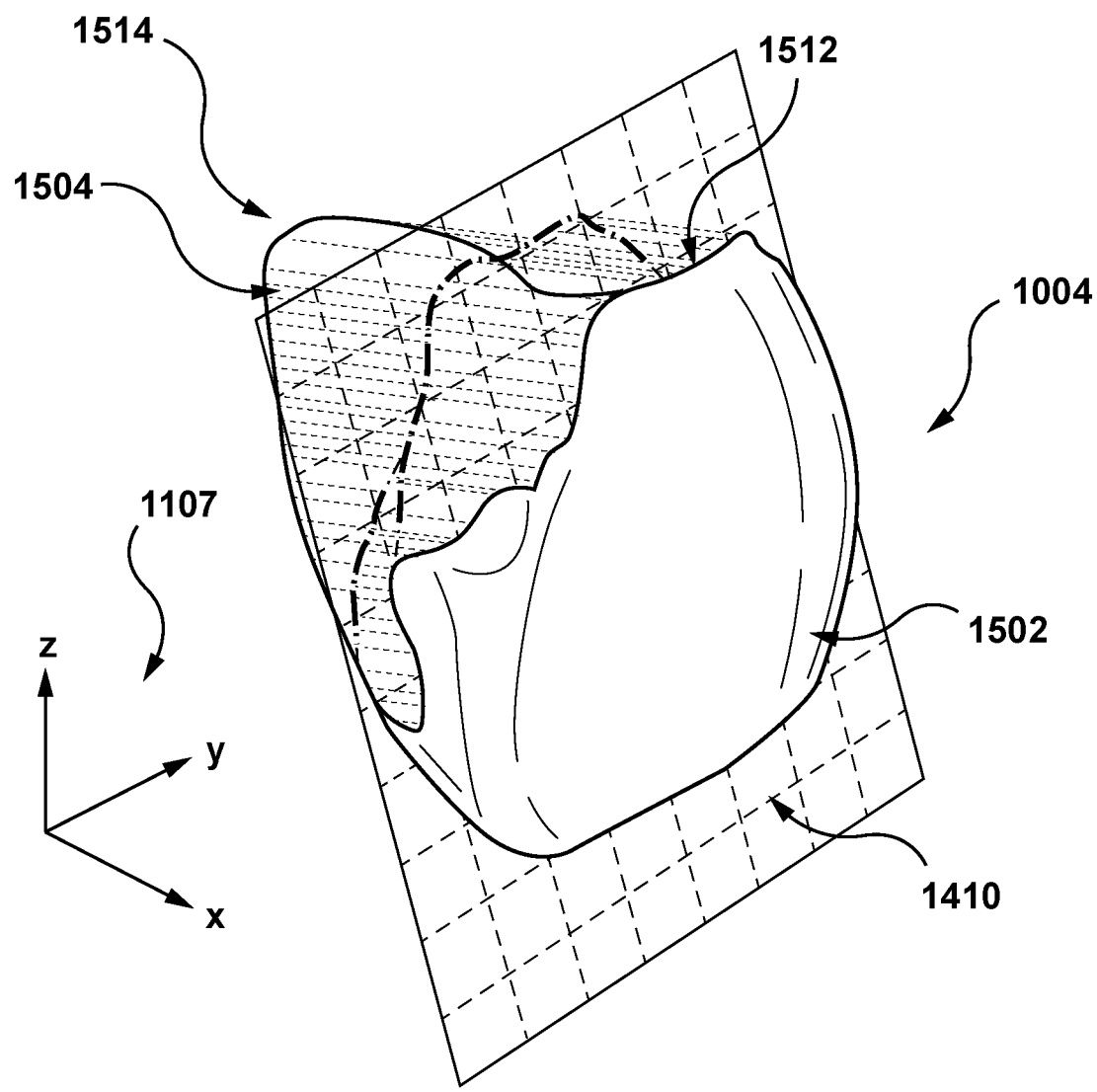
FIG. 15 depicts a perspective view of the second 3D crown model of FIG. 10 dissected by the linguolabial plane used by the processor of FIG. 8 for determining a labial edge curve and a lingual edge curve, in accordance with certain non-limiting embodiments of the present technology.
Figure 16:
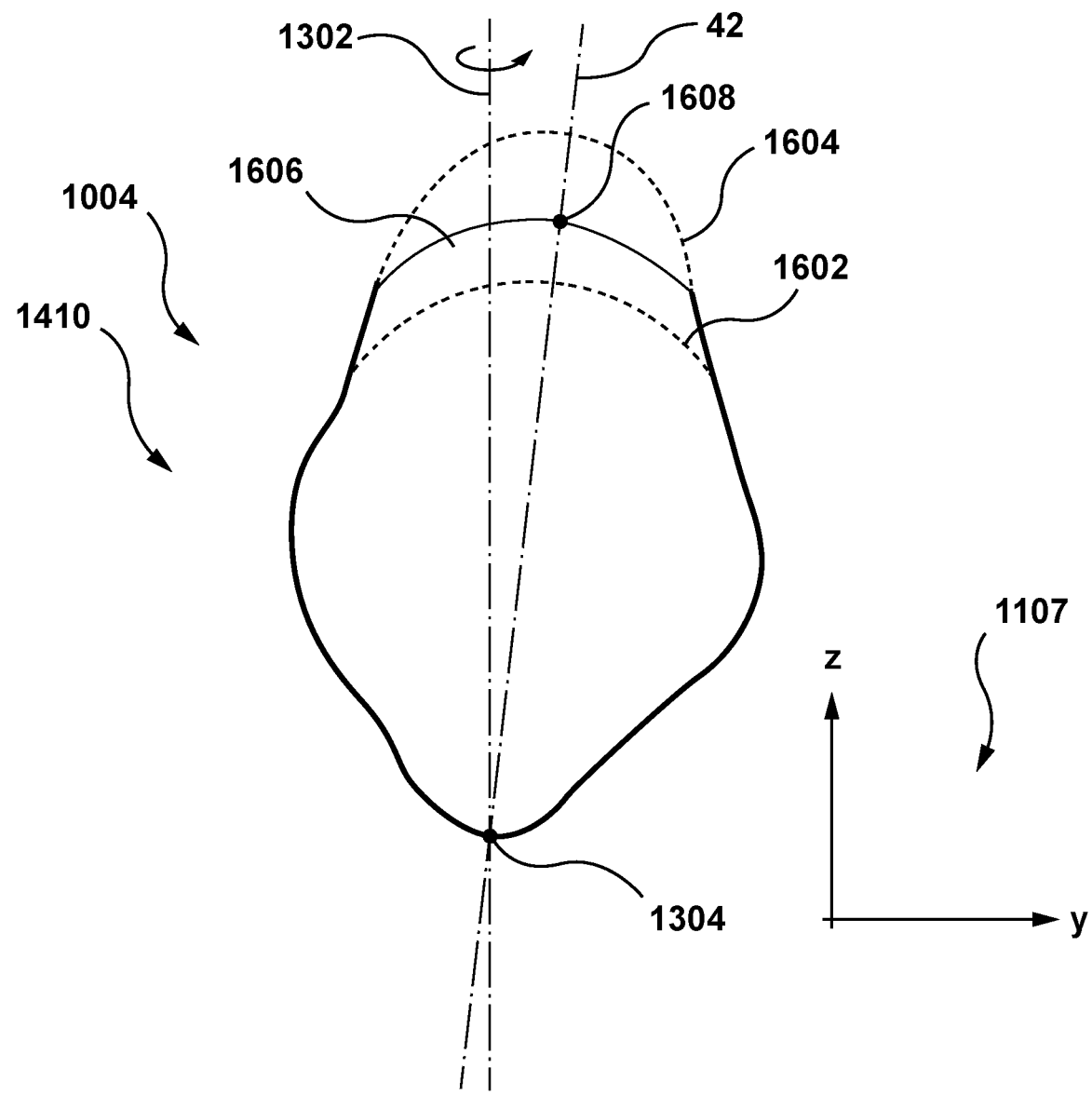
FIG. 16 depicts a cross-sectional labial view of the second 3D crown model of FIG. 10 used by the processor of FIG. 10 for determining the linguolabial edge curve, based on the lingual edge curve and the labial edge curve present in FIG. 15, and a respective linguolabial edge point for orienting the second guide axis of FIG. 13, thereby determining the tooth axis for the one of the plurality of teeth present in FIG. 1, in accordance with certain non-limiting embodiments of the present technology.

With reference to FIGS. 15 and 16, there is depicted a perspective view of the second 3D crown model 1004 dissected by the linguolabial plane 1410 and a cross-sectional labial view thereof produced by the linguolabial plane 1410, respectively, for determining a linguolabial edge curve 1606, in accordance with certain non-limiting embodiments of the present technology.

According to some non-limiting embodiments of the present technology, the processor 850 may be configured to determine the linguolabial edge curve 1606 based on projecting so-called naked edges of each one of a labial surface 1502 and a lingual surface 1504 of the second 3D crown model 1004 onto the linguolabial plane 1410.

In the context of the present specification, the term "naked edge" relates to mesh representation techniques of objects (such as using triangle meshes, for example) and is referred to as an edge of a given mesh element of a given mesh representation associated with an object surface that forms only that given mesh element without being joined to any other mesh element of the given mesh representation (that is, does not form any adjacent mesh elements). Specifically, as an example, if the object surface is an open surface (such as that represented by the one of the first 3D crown model 1002 and the second 3D crown model 1004), its naked edges may be found at a boundary of the associated given mesh representation.

Thus, the processor 850 may be configured to identify labial naked edges 1512 on the labial surface 1502, and lingual naked edges 1514 on the lingual surface 1504. Further, according to some non-limiting embodiments of the present technology, the processor 850 may be configured to project the labial naked edges 1512 onto the linguolabial plane 1410, thereby generating a labial edge curve 1602. By the same token, the processor 850 may be configured to project the lingual naked edges 1514 onto the linguolabial plane 1410, thereby generating a lingual edge curve 1604.

In some non-limiting embodiments of the present technology, the processor 850 may further be configured to smooth each one of the labial edge curve 1602 and the lingual edge curve 1604. To that end, the processor 850 may be configured to execute one or more smoothing algorithms, which may include, without being limited to: a kernel smoothing algorithm (such as an exponential kernel algorithm, for example), a polynomial smoothing algorithm, a Bezier smoothing algorithm, and the like.

Finally, according to some non-limiting embodiments of the present technology, using one of the curve fitting techniques described hereinabove with reference to FIG. 12 in respect of the first average intersection curve 1210, and based on the labial edge curve 1602 and the lingual edge curve 1604, the processor 850 may be configured to generate the linguolabial edge curve 1606.

Further, the processor 850 may be configured to determine a linguolabial edge point 1608 on the linguolabial edge curve 1606 for orienting the second guide axis 1302 thereto, thereby determining the tooth axis 42.

In some non-limiting embodiments of the present technology, the processor 850 may be configured to determine the linguolabial edge point 1608 as a maximum point of the linguolabial edge curve 1606 along the Z axis within the second coordinate system 1107. Accordingly, in those non-limiting embodiments of the present technology, which are directed to determining a tooth axis for the given one of the lower teeth 17 based on a respective 3D crown model, a respective linguolabial edge point may be determined, by the processor 850, as a minimum point of an associated linguolabial edge curve along the Z axis within the associated coordinate system.

Finally, according to certain non-limiting embodiments of the present technology, having determined the linguolabial edge point 1608, the processor 850 may be configured to modulate a current position of the second guide axis 1302 to extend it through the linguolabial edge point 1608, thereby determining the tooth axis 42. For example, the processor 850 may be configured to rotate the second guide axis 1302 around the Z axis of the second coordinate system 1107 until it matches the linguolabial edge point 1608.

Thus, it can be said that the processor 850 may be configured to determine the tooth axis 42 of the tooth 16c, based on the second 3D crown model 1004 of the crown portion 26, as a line having been generated based on the second intersection curve 1312 and extending through the second separation point 1304 and the linguolabial edge point 1608.

Determining CR Point

As previously noted, according to the non-limiting embodiments of the present technology, the processor 850 may further be configured to determine the CR point 40 for the tooth 16c on the tooth axis 42 associated therewith. This section equally applies to both Scenario 1 and Scenario 2.

In some non-limiting embodiments of the present technology, the processor 850 may be configured to determine the CR point 40 on the tooth axis 42 based on dimension data of the tooth 16c, such as that of the crown portion 26 and the root portion 28.

In this regard, the processor 850 may be configured to determine a crown portion height of the crown portion 26 based on one of the first 3D crown model 1002 and the second 3D crown model 1004. As previously mentioned, each of the first 3D crown model 1002 and the second 3D crown model 1004 may be represented by a respective plurality of mesh elements, where a given mesh element is typically characterized by a number of vertices and a number of edges. Thus, in some non-limiting embodiments of the present technology, in order to determine the crown portion height, the processor 850 may be configured to project each vertex of a respective plurality of mesh elements associated with one of the first 3D crown model 1002 and the second 3D crown model 1004 onto the tooth axis 42. Further, the processor 850 may be configured to determine the crown portion height of the crown portion 26 as a difference in distance between a maximum point and a minimum point (most distant ones from each other of the so projected vertices along the tooth axis 42) of a respective one of the first 3D crown model 1002 and the second 3D crown model 1004 along the tooth axis 42 within a respective one of the coordinate system 1105 and the second coordinate system 1107.

In other non-limiting embodiments of the present technology, the processor 850 may be configured to determine the crown portion height by constructing a so-called bounding box around one of the first 3D crown model 1002 and the second 3D crown model 1004.

In the context of the present specification, the term "bounding box" is broadly referred to as a three-dimensional box (or a parallelepiped) of a smallest possible measure (such as an area or a volume thereof) allowing for entirely enclosing a given point set (such as vertices of a respective plurality of mesh elements associated with one of the first 3D crown model 1002 and the second 3D crown model 1004).

Figure 17:
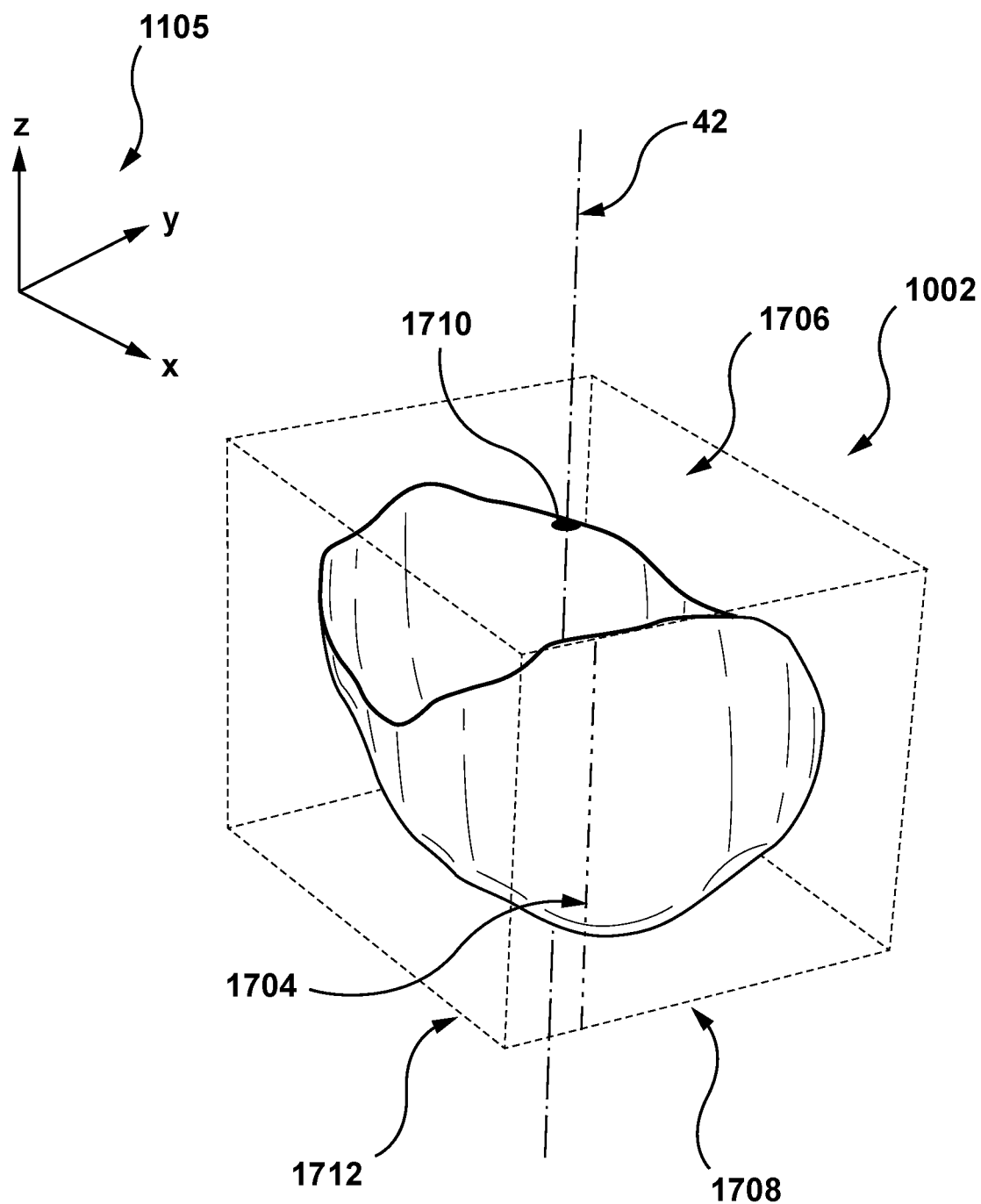
FIG. 17 depicts a schematic diagram of one of the first 3D crown model and the second crown model of FIG. 10 enclosed in a bounding box used by the processor of FIG. 8 for determining a crown portion height of the crown portion associated with the one of the plurality of teeth present in FIG. 1, in accordance with certain non-limiting embodiments of the present technology.

With reference to FIG. 17, there is depicted a perspective view of the first 3D crown model 1002 enclosed in a bounding box 1702 constructed by the processor 850 for determining a crown portion height 1704 of the crown portion 26, in accordance with certain non-limiting embodiments of the present technology.

As it can be appreciated from FIG. 17, the crown portion height 1704 may be determined, by the processor 850 within the coordinate system 1105, as a perpendicular distance between an upper surface 1706 and a lower surface 1708 of the bounding box 1702. The processor 850 may also be configured to determine, within the second coordinate system 1107, a maximum point 1710 and a minimum point 1712 of the first 3D crown model 1002 along the tooth axis 42 as respective intersection points between the upper surface 1706 and the lower surface 1708 and the tooth axis 42.

In some non-limiting embodiments of the present technology, the processor 850 may be further configured to modulate the crown portion height 1704 by increasing or decreasing it by a predetermined distance, such 1 mm, for example.

Further, to determine a root portion height of the root portion 28, according to some non-limiting embodiments of the present technology, the processor 850 may be configured to have access to tooth reference data indicative of approximate tooth heights (or otherwise tooth lengths averaged over a certain sample of subjects) of respective ones of the upper teeth 16 and the lower teeth 17. In these embodiments, the reference tooth data may be stored, for example, in the solid-state drive 860.

$$\delta_c^3 = \frac{\Delta L_c^3}{\Delta Lc} = \frac{0.2 \text{ mm}}{1.4 \text{ mm}} \approx 0.143, \quad (2)$$

where $\Delta L_c^3$ is an absolute crown portion height delta of the crown portion height 1704 of the maxillary tooth 3; and $\Delta L_c$ is an average absolute crown portion height delta for the maxillary tooth 3.

Further, the processor 850 may be configured to determine the absolute root height portion delta for the maxillary tooth 3 according to the following equation:

$$\Delta L_r^3 = \delta_c^3 \cdot \Delta L_r = 0.143 \cdot 2.4 \text{ mm} \approx 0.3 \text{ mm}, \quad (3)$$

where $\Delta L_r$ is an average absolute root portion height delta for the maxillary tooth 3.

Thus, the processor 850 may be configured to determine the root portion height of the root portion 28 in accordance with the following equation:

$$L_r^3 = mL_r^3 - \Delta L_r^3 = 15.9 \text{ mm} - 0.3 \text{ mm} = 15.6 \text{ mm}, \quad (4)$$

where $mL_r^3$ is a mean root portion height of the maxillary tooth 3, according to Table 1.

TABLE 1

Tooth Reference Data

| | Maxillary | | | Mandibular | | |
|---|---|---|---|---|---|---|
| Tooth number | Total tooth height ($mL_t \pm \Delta L_t$), mm | Crown portion height ($mL_t \pm \Delta L_t$), mm | Root portion height ($mL_t \pm \Delta L_t$), mm | Total tooth height ($mL_t \pm \Delta L_t$), mm | Crown portion height ($mL_t \pm \Delta L_t$), mm | Root portion height ($mL_t \pm \Delta L_t$), mm |
| 1 | 22.2 ± 1.9 | 9.2 ± 1.5 | 13.0 ± 1.7 | 20.3 ± 1.8 | 7.5 ± 1.3 | 12.8 ± 1.6 |
| 2 | 21.5 ± 1.8 | 8.6 ± 1.2 | 12.9 ± 1.6 | 21.8 ± 1.9 | 8.2 ± 1.1 | 13.7 ± 1.6 |
| 3 | 25.6 ± 2.7 | 9.7 ± 1.4 | 15.9 ± 2.4 | 25.1 ± 2.8 | 9.8 ± 1.4 | 15.3 ± 2.1 |
| 4 | 20.7 ± 2.0 | 7.1 ± 1.0 | 13.6 ± 1.8 | 21.5 ± 1.8 | 7.8 ± 1.1 | 13.7 ± 1.7 |
| 5 | 20.8 ± 2.0 | 6.7 ± 0.9 | 14.4 ± 1.9 | 21.9 ± 1.9 | 6.7 ± 1.1 | 15.2 ± 1.8 |
| 6 | 19.5 ± 1.8 | 6.2 ± 0.6 | 13.3 ± 1.7 | 20.2 ± 1.7 | 5.8 ± 0.9 | 14.5 ± 1.7 |
| 7 | 19.6 ± 1.9 | 6.6 ± 0.8 | 13.0 ± 1.8 | 20.2 ± 1.7 | 6.1 ± 0.9 | 14.1 ± 1.7 |
| 8 | 18.4 ± 2.0 | 6.2 ± 0.9 | 12.2 ± 2.0 | 18.9 ± 1.9 | 6.1 ± 0.9 | 12.8 ± 1.9 |

Referring to Table 1, there is provided tooth reference data for at least some of the upper teeth 16 (maxillary) and the lower teeth 17 (mandibular) including data of approximate total tooth heights and that of respective crown portion heights and respective root portion heights. Thus, for example, assuming that the tooth 16c is a maxillary tooth 3, according to Table 1, and it has been determined that the crown portion height of the crown portion 26 (such as the crown portion height 1704) is 9.5 mm, the processor 850 may be configured to determine a root portion height of the root portion 28 to be 15.9±2.4 mm. Further, the processor 850 may be configured to determine an absolute root delta value of the so determined root portion height of the maxillary tooth 3. For example, according to Table 1, given that the crown portion height 1704 of the maxillary tooth 3 is 0.2 mm lower than a mean crown portion height value $mL_c^3$ which is 9.7 mm, the processor 850 may be configured to determine a relative crown portion height delta according to the following equation:

Finally, using the so determined root portion height of the root portion 28, the processor 850 may be configured to determine the CR point 40 associated with the tooth 16c on the tooth axis 42.

Figure 18:
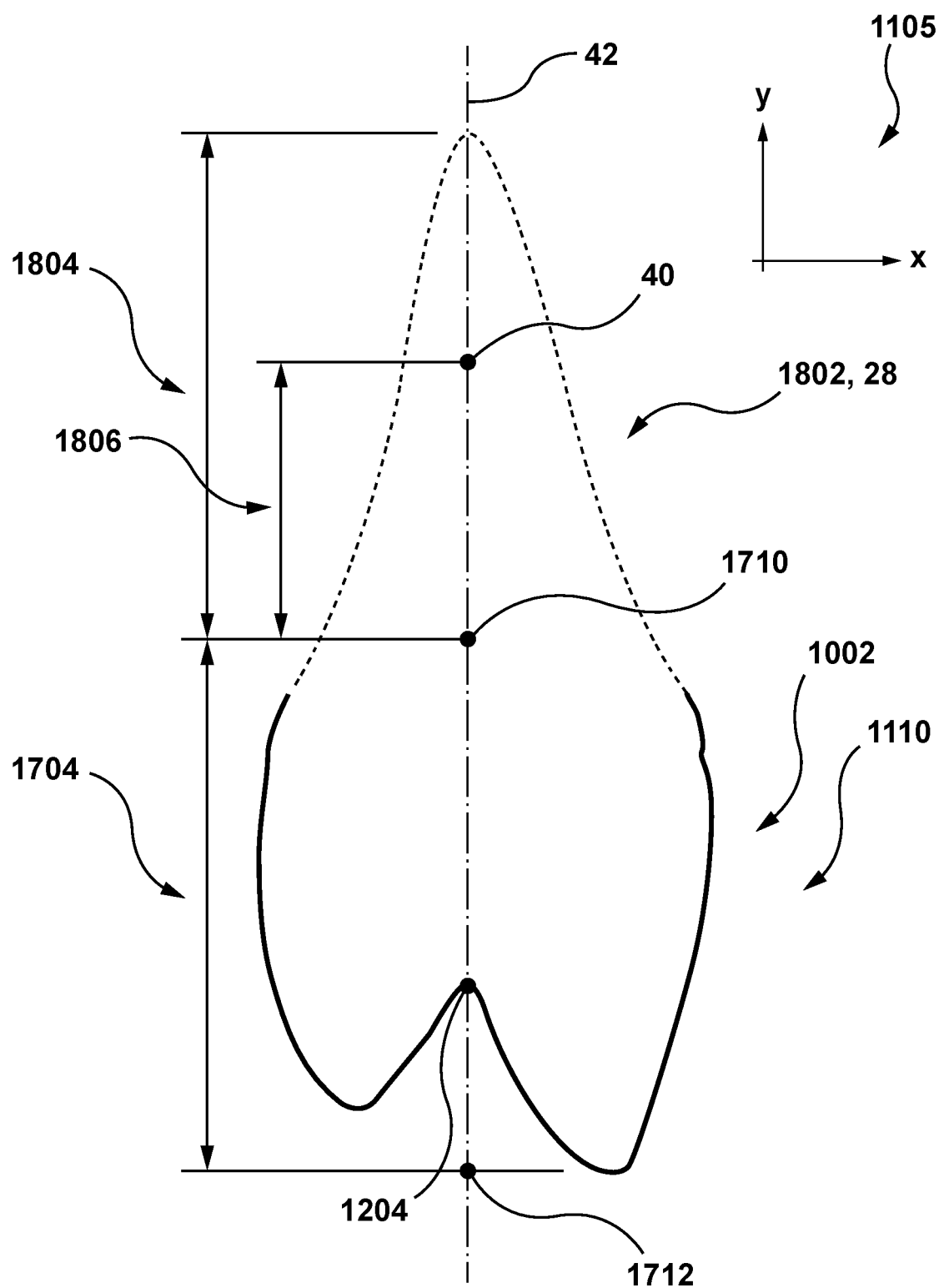
FIG. 18 depicts a cross-sectional mesiodistal view of one of the first 3D crown model and the second 3D crown model of FIG. 10 used by the processor of FIG. 8 for determining a CR point for the one of the plurality of teeth present in FIG. 1 on the determined tooth axis associated therewith, in accordance with certain non-limiting embodiments of the present technology.

With reference to FIG. 18, there is depicted a cross-sectional mesiodistal view of the first 3D crown model 1002 produced, for example, by the first mesiodistal plane 1110, for determining the CR point 40 on the tooth axis 42 of the tooth 16c based on a root portion height 1804 of the root portion 28, in accordance with certain non-limiting embodiments of the present technology.

In some non-limiting embodiments of the present technology, the processor 850 may be configured to render a schematic root representation 1802 of the root portion 28 based at least on the tooth axis 42, the crown portion height 1704, and the root portion height 1804.

Further, according to some non-limiting embodiments of the present technology, based on the root portion height 1804, the processor 850 may be configured to determine a CR distance 1806, at which the processor 850 may further determine the CR point 40 along the tooth axis 42 from the first 3D crown model 1002 representative of the crown portion 26.

In some non-limiting embodiments of the present technology, the processor 850 may be configured to determine the CR distance 1806 according to the following equation:

$$D_{CR}=k \cdot L_r, \quad (5)$$

where $D_{CR}$ is the CR distance 1806;
k is a proportional coefficient; and
$L_r$ is the root portion height 1804.

In specific non-limiting embodiments of the present technology, the proportional coefficient k may be 0.5; however, in other non-limiting embodiments of the present technology, other values of the proportional coefficient k, such as 0.3 or 0.4, may also be used. Thus, for example, given that the tooth 16c is the maxillary tooth 3, the CR distance 1806 may be determined as 0.5.15.6 mm=8.3 mm.

In some non-limiting embodiments of the present technology, the processor 850 may be configured to determine the CR point 40 associated with the tooth 16c, on the tooth axis 42, as a point located thereon at the CR distance 1806 from the maximum point 1710. Accordingly, in the embodiments of the present technology implemented in respect of the respective one of the lower teeth 17, the processor 850 may be configured to determine a respective CR point on the associated tooth axis to be located at a so determined respective CR distance from a corresponding minimum point of the respective 3D crown model.

Thus, having determined a respective CR point for each of the upper teeth 16, the processor 850 may be configured to cause display (for example, in the screen 722) of each of 3D crown models associated with respective crown portions of the upper teeth 16 along with so determined tooth axes and the CR points so determined thereon.

Figure 19:
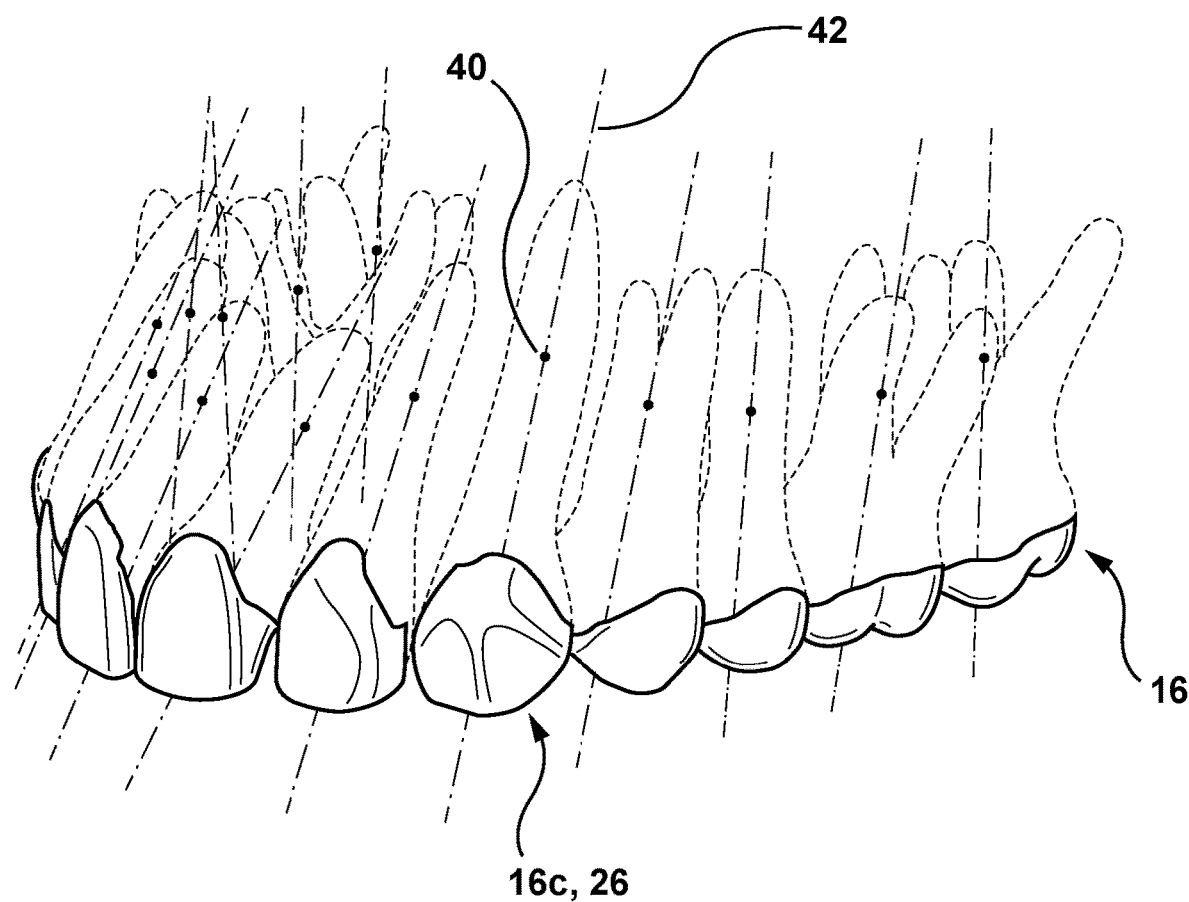
FIG. 19 depicts a plurality of 3D crown models respectively associated with the plurality of teeth of the upper arch form present in FIG. 2 used by the processor of FIG. 8 for planning the orthodontic treatment, in accordance with certain non-limiting embodiments of the present technology.

FIG. 19 depicts a plurality of the 3D crown models respectively corresponding to the upper teeth 16 and associated with so determined tooth axes and CR points thereon. Thus, in some non-limiting embodiments of the present technology, the processor 850 may be configured to use the tooth axis 42 and the CR point 40 determined thereon for modelling at least some of the tooth movements described above with reference to FIGS. 3 to 6 for planning and/or determining the orthodontic treatment for the subject aimed to cause the tooth 16c to move towards the aligned position.

Figure 20:
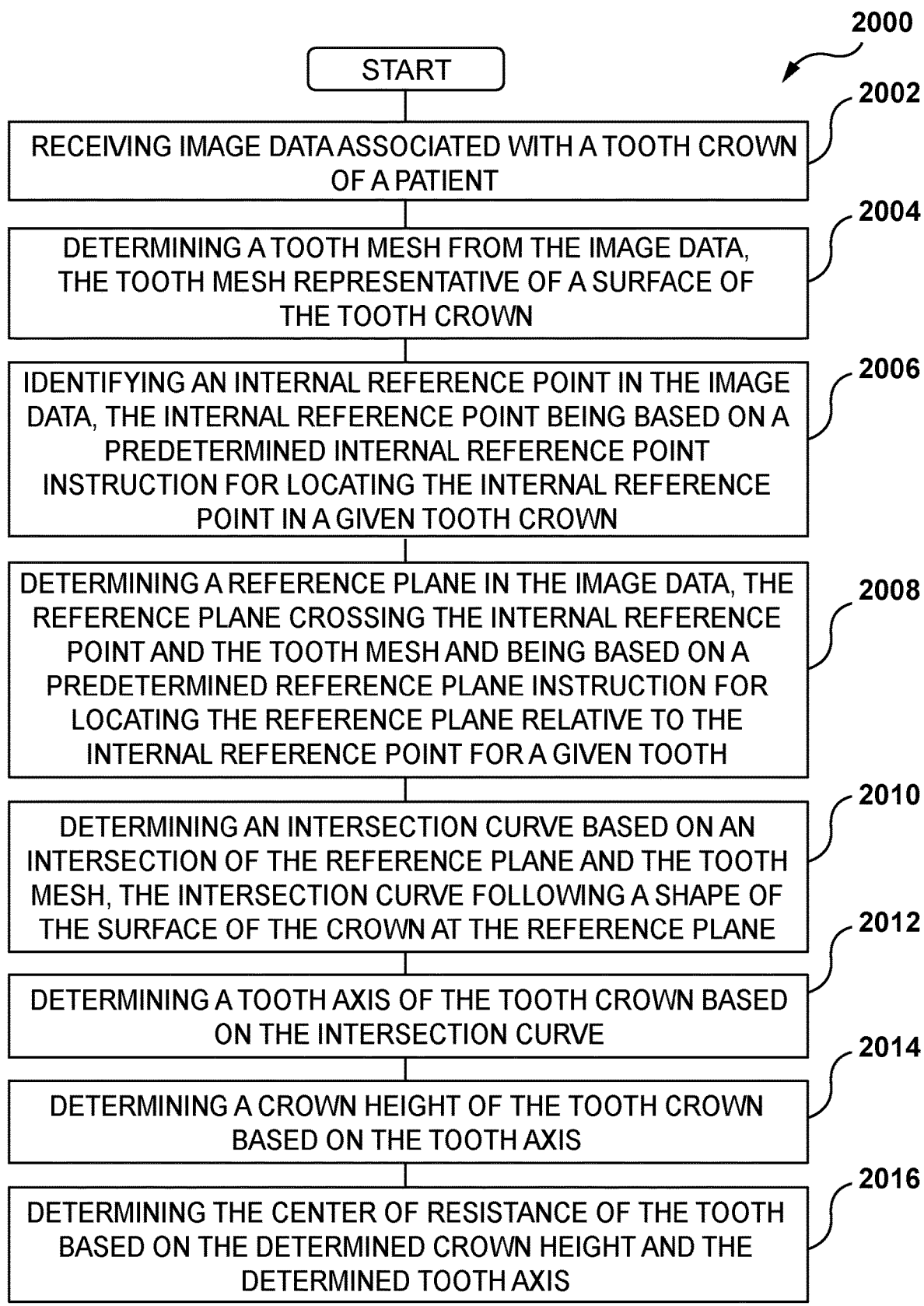
FIG. 20 depicts a flowchart of a method for planning the orthodontic treatment for the subject of FIG. 1 based on the determined CR point, in accordance with certain embodiments of the present technology.

Given the architecture and the examples provided hereinabove, it is possible to execute a method for determining CR point for a given tooth (such as the tooth 16c) for planning an orthodontic treatment for the subject. With reference to FIG. 20, there is depicted a flowchart of a method 2000, according to the non-limiting embodiments of the present technology. The method 2000 can be executed by a processor of a computing environment, such as the processor 850 of the computing environment 840.

Step 2002: Receiving Image Data Associated with a Tooth Crown of a Patient

The method 2000 commences at step 2002 where the processor 850 can be configured to receive the image data associated with the subject's teeth (for example, the upper teeth 16 or the lower teeth 17). To that end, in some non-limiting embodiments of the present technology, the processor 850 may be configured to receive a 3D model representing current configuration of subject's arch forms, such as the 3D model 900 depicted in FIG. 9.

Further, as noted hereinabove, the processor 850 may be configured to apply one or more automatic tooth segmentation algorithms to segment the 3D model 900 into a plurality of 3D crown models respectively associated with each of the upper teeth 16 and the lower teeth 17, such as one of the first 3D crown model 1002 and the second 3D crown model 1004 of the crown portion 26 associated with the tooth 16c.

Step 2004: Determining a Tooth Mesh from the Image Data, the Tooth Mesh Representative of a Surface of the Tooth Crown At step 2004, according to certain embodiments of the present technology, the processor 850 may be configured to render one of the first 3D crown model 1002 and the second 3D crown model 1004 as a respective plurality of mesh elements (such as polygonal meshes) formatted in one of image file formats (such as STL, OBJ, PLY, and the like).

Step 2006: Identifying an Internal Reference Point in the Image Data, the Internal Reference Point being Based on a Predetermined Internal Reference Point Instruction for Locating the Internal Reference Point in a Given Tooth Crown At step 2006, the method 2000 is directed to starting to analyze curvature of the crown portion 26 by determining a respective intersection curve of one of the first 3D crown model 1002 and the second 3D crown model 1004 with a respective mesiodistal plane. To that end, according to some non-limiting embodiments, the processor 850 may be configured to determine an origin for constructing the respective mesiodistal plane as a reference point determined for each of the first 3D crown model 1002 and the second 3D crown model 1004 (such as the reference point 1108 associated with the first 3D crown model 1002).

Thus, for determining the reference point 1108, first, the processor 850 can be configured to identify a mesial point and a distal point on the mesial surface and the distal surface of the first 3D crown portion 1002, respectively—such as the distal point 1102 and the mesial point 1104 as described above with reference to FIG. 11.

Further, the processor 850 may be configured to join the distal point 1102 and the mesial point 1104, thereby generating the mesiodistal line 1106 extending through the first 3D crown model 1002. Finally, applying a predetermined rule, the processor 850 may be configured to determine the reference point 1108. In some non-limiting embodiments of the present technology, the processor 850 may be configured to determine the reference point 1108 as a midpoint of the mesiodistal line 1106.

Further, according to some non-limiting embodiments of the present technology, using so determined the mesiodistal line 1106 and the reference point 1108 thereon, the processor 850 may further be configured to define a coordinate system (such as the coordinate system 1105) for the first 3D crown model 1102.

By the same token, as described above with reference to FIGS. 13 and 14, for the second 3D crown model 1004, the processor 850 may be configured to (1) identify the second distal point 1402 and the second mesial point 1404; (2) join the second distal point 1402 and the second mesial point 1404, thereby generating the second mesiodistal line 1406; and (3) determine, on the second mesiodistal line 1406, the second reference point 1308. Further, the processor 850 may be configured to define, based on the second reference point 1308, the second coordinate system 1107 for the second 3D crown model 1004.

Step 2008: Determining a Reference Plane in the Image Data, the Reference Plane Crossing the Internal Reference Point and the Tooth Mesh and being Based on a Predetermined Reference Plane Instruction for Locating the Reference Plane Relative to the Internal Reference Point for a Given Tooth At step 2008, the method 2000 is directed to determining respective mesiodistal planes, such as the first mesiodistal plane 1110 for the first 3D crown model 1002 and the second mesiodistal plane 1320 for the second 3D crown model 1004.

To that end, according to certain non-limiting embodiments of the present technology, the processor 850 may be configured to determine each of the first mesiodistal plane 1110 and the second mesiodistal plane 1320 to originate in a respective one of the reference point 1108 and the second reference point 1308 and to be perpendicular to a respective one of the mesiodistal line 1106 and the second mesiodistal line 1406.

Step 2010: Determining an Intersection Curve Based on an Intersection of the Reference Plane and the Tooth Mesh, the Intersection Curve Following a Shape of the Surface of the Crown at the Reference Plane According to certain non-limiting embodiments of the present technology, having determined each of the first mesiodistal plane 1110 and the second mesiodistal plane 1320, at step 2010, the processor 850 may further be configured to determine intersection thereof with a respective one of the first 3D crown model 1002 and the second 3D crown model 1004, thereby generating the first intersection curve 1112 and the second intersection curve 1312, respectively, as described above with reference to FIGS. 11 and 13.

Step 2012: Determining a Tooth Axis of the Tooth Crown Based on the Intersection Curve At step 2012, the processor 850 is configured to determine the tooth axis 42 for the crown portion 26, based on one of the first intersection curve 1112 and the second intersection curve 1312, for further determining thereon the CR point 40. To that end, according to some non-limiting embodiments of the present technology, first, the processor 850 may be configured to generate a respective guide axis associated with each of the first 3D crown model 1002 and the second 3D crown model 1004.

In this regard, first, the processor 850 may be configured to segment each of the first intersection curve 1112 and the second intersection curve 1312, into at least two subcurves (such as the first subcurve 1206 and the second subcurve 1208 of the first intersection curve 1112), by a respective separation point, such as the first separation point 1204 and the second separation point 1304.

According to some non-limiting embodiments of the present technology, the processor 850 may be configured to determine the first separation point 1204 as a point on the first intersection curve 1112 closest, within the coordinate system 1105, to the reference point 1108. Further, in other non-limiting embodiments of the present technology, the processor 850 may be configured to determine the second separation point 1304 as a minimum point of the second intersection curve 1312 within the second coordinate system 1107. In these embodiments, a separation point associated with a 3D crown model (not separately depicted) of the respective one of the lower teeth 17 may be identified, by the processor 850, as a maximum point of an associated intersection curve along a Z axis within an associated coordinate system.

Further, based on one of the first separation point 1204 and the second separation point 1304, the processor 850 may be configured to generate the first average intersection curve 1210 and the second average intersection curve 1310, respectively, using one or more curve fitting techniques, as described above with reference to FIGS. 12 and 13.

Finally, according to some non-limiting embodiments of the present technology, applying the linear regression algorithm to each of the first average intersection curve 1210 and the second average intersection curve 1310, the processor may hence be configured to generate the first guide axis 1202 and the second guide axis 1302, respectively.

According to some non-limiting embodiments of the present technology, the first guide axis 1202, extending through the first separation point 1204, may comprise the tooth axis 42 for the crown portion 26.

According to other non-limiting embodiments of the present technology, the tooth axis 42 may be determined based on the second guide axis 1302 by angular modulation thereof in a linguolabial plane (such as the linguolabial plane 1410) associated with the second 3D crown model 1004.

To that end, according to certain non-limiting embodiments of the present technology, the processor 850 may be configured to determine the linguolabial plane 1410 as a plane parallel to the second mesiodistal line 1406. In alternative non-limiting embodiments of the present technology, the processor 850 may be configured to determine the linguolabial plane 1410 as a plane parallel to the second mesiodistal line 1406 and perpendicular to the to the second mesiodistal plane 1320 as described with reference to FIG. 14.

Further, upon determination of the linguolabial plane 1410, the processor 850 may be configured to construct therein a linguolabial edge curve (such as the linguolabial edge curve 1606). According to certain non-limiting embodiments of the present technology, the processor 850 may be configured to construct the linguolabial edge curve 1606 based on projecting the labial naked edges 1512 and lingual naked edges 1514 onto the linguolabial plane 1410 as described above with reference to FIGS. 15 and 16.

Finally, by identifying a maximum point (or a minimum point for a given one of the lower teeth 17) on the linguolabial edge curve 1606 within the second coordinate system 1107, the processor 850 may be configured to determine the linguolabial edge point 1608 and further configured to modulate a current position of the second guide axis 1302 to extend it through the linguolabial edge point 1608, thereby determining the tooth axis 42. For example, the processor 850 may be configured to rotate the second guide axis 1302 around the Z axis of the second coordinate system 1107 until it matches the linguolabial edge point 1608.

Step 2014: Determining a Crown Height of the Tooth Crown Based on the Tooth Axis According to certain non-limiting embodiments of the present technology, the processor 850 can be configured to determine the CR point 40 on the so determined tooth axis 42 based on the dimension data associated with the tooth 16c.

Thus, at step 2014, the processor 850 may be configured to determine the crown portion height of the crown portion 26 based on one of the first 3D crown model 1002 and the second 3D crown model 1004.

In some non-limiting embodiments of the present technology, the processor 850 may be configured to determine the crown height portion based on projecting each vertex of a respective plurality of mesh elements associated with one of the first 3D crown model 1002 and the second 3D crown model 1004 onto the tooth axis 42. Further, the processor 850 may be configured to determine the crown portion height of the crown portion 26 as a difference in distance between a maximum point and a minimum point (most distant ones from each other of the so projected vertices along the tooth axis 42) of a respective one of the first 3D crown model 1002 and the second 3D crown model 1004 along the tooth axis 42 within a respective one of the coordinate system 1105 and the second coordinate system 1107.

In other non-limiting embodiments of the present technology, the processor 850 may be configured to determine the crown height portion of the crown portion 26 by constructing therearound a bounding box, such as the bounding box 1702, as described above with reference to FIG. 17.

In some non-limiting embodiments of the present technology, the processor 850 may further be configured to modulate the so determined crown portion height by increasing or decreasing it by a predetermined distance, such 1 mm, for example.

Step 2016: Determining the Center of Resistance of the Tooth Based on the Determined Crown Height and the Determined Tooth Axis According to some non-limiting embodiments of the present technology, at step 2016, first, the processor 850 may be configured to determine the root portion height of the root portion 28 of the tooth 16c. To that end, the processor 850 may have access to tooth reference data, such as that provided in Table 1. Further, the processor 850 may be configured to determine the root portion height corresponding to a given configuration of the tooth 16c and based on the determined crown portion height, using Equations (2) to (4).

Further, based on the so determined root portion height, the processor 850 may be configured to determine a distance at which the CR point 40 is to be located on the tooth axis 42 from the crown portion 26—such as the CR distance 1806. The processor 850 may be configured to determine the CR distance 1806 in accordance with Equation (5).

In specific non-limiting embodiments of the present technology, the processor 850 may be configured to determine the CR distance 1806 as a half of the root portion height of the root portion 28.

Finally, the processor 850 may be configured to determine the CR point 40 associated with the tooth 16c, on the tooth axis 42, as a point located thereon at the CR distance 1806 from the maximum point (or a minimum point for the given one of the lower teeth 17) associated with a respective one of the first 3D crown model 1002 and the second 3D crown model 1004 (such as the maximum point 1710 associated with the first 3D crown model 1002).

According to certain non-limiting embodiments of the present technology, applying the method 2000 to crown portions of each of the upper teeth 16, the processor 850 may be configured to determine the respective CR points associated therewith. Further, as described with reference to FIG. 19, the processor 850 may be configured to cause display (for example, in the screen 722) of each of 3D crown models associated with respective crown portions of the upper teeth 16 along with so determined tooth axes and the CR points so determined thereon. The so depicted 3D crown models may further be used for developing the orthodontic treatment for the subject, for example, by modelling, for the tooth 16c, at least some of the tooth movements described above with reference to FIGS. 3 to 6.

Thus, certain embodiments of the method 2000 allow for a more subject- and tooth-specific determination of a respective tooth axis for each of the upper teeth 16 and lower teeth 17, such as the tooth axis 42 for the tooth 16c, and further determining thereon a respective CR point (such as the CR point 40) using image data representative only of respective crown portions thereof (such as one of the first 3D crown model 1002 and the second 3D crown model 1004) captured, for example, by a conventional intraoral scanner. Such an approach may allow for a more accurate modelling of one of the tooth movements described above with reference to FIGS. 3 to 6 with a more efficient use of computational resources (that is, without a need for considering additional image data, such CT/magnetic resonance scans or panoramic radiograph), which may eventually enable to plan orthodontic treatments more effectively and efficiently at an expected level of accuracy thereof.

The method 2000 hence terminates.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for determining a center of resistance point of a tooth for orthodontic treatment planning, the method being executable by a processor, the method comprising:
   obtaining a tooth mesh from image data associated with a tooth crown of a patient, the tooth mesh being representative of a surface of the tooth crown;
   identifying an internal reference point in the image data, the internal reference point being a mesiodistal center of the tooth crown, the identifying the internal reference point comprising:
      obtaining a mesial point on a mesial side of the tooth crown, and a distal point on a distal side of the tooth crown;
      generating a mesiodistal line joining the mesial point and the distal point;
      identifying the mesiodistal center as a midpoint on the mesiodistal line;
   determining a reference plane in the image data, the reference plane being perpendicular to the mesiodistal line and extending through the mesiodistal center;
   determining an intersection curve based on an intersection of the reference plane and the tooth mesh, the intersection curve following a shape of the surface of the crown at the reference plane;
   determining a tooth axis of the tooth crown based on the intersection curve;
   determining a crown height of the tooth crown based on the tooth axis; and
   determining the center of resistance of the tooth based on the determined crown height and the determined tooth axis.

2. The method of claim 1, wherein the determining the tooth axis of the tooth crown based on the intersection curve comprises:
   bisecting the intersection curve into two intersection curve parts based on a separation point;
   generating an average intersection curve using the two intersection curve parts;
   generating, based on the average intersection curve, a guide axis using a linear regression algorithm; and
   determining the tooth axis based on the guide axis.

3. The method of claim 2, wherein if the tooth is a premolar tooth or a molar tooth, the separation point comprises:
   a point on the intersection curve which is closest to the internal reference point, and the tooth axis is determined as the guide axis.

4. The method of claim 2, wherein if the tooth is an incisor tooth or a canine tooth, the separation point comprises:

for maxillary teeth, a minimum point of the intersection curve along a Z axis direction for maxillary teeth; and for mandibular teeth, a maximum point of the intersection curve in a Z axis direction for mandibular teeth.

5. The method of claim 4, wherein the determining the tooth axis comprises:

determining a linguolabial reference plane which is parallel to the mesiodistal line;

dissecting the surface of the tooth crown, by the linguolabial reference plane, into a lingual surface and a labial surface;

identifying lingual naked edges on the lingual surface of the surface of the tooth crown;

identifying labial naked edges on the labial surface of the surface of the tooth crown;

generating a lingual edge curve based on projecting the lingual naked edges onto the linguolabial reference plane;

generating a labial edge curve based on projecting the labial naked edges onto the linguolabial reference plane;

generating, based on the lingual edge curve and the labial edge curve, an average linguolabial edge curve;

determining a linguolabial edge point, the determining comprises:

for maxillary teeth, identifying a maximum point of the linguolabial edge curve along a Z axis associated with the linguolabial reference plane; and for mandibular teeth, identifying a minimum point of the linguolabial edge curve along the Z axis associated with the linguolabial reference plane; and determining the tooth axis by rotating the guide axis around the Z axis associated with the linguolabial reference plane until it matches the linguolabial edge point on the linguolabial plane.

6. The method of claim 3, wherein the determining the crown height comprises generating a bounding box around the tooth mesh and along the determined tooth axis, and determining the crown height as a height of the tooth mesh along the tooth axis.

7. The method of claim 3, wherein the determining the crown height comprises projecting tooth mesh vertices of the tooth mesh onto the tooth axis, and determining a distance difference between a minimum point and maximum point along the tooth axis.

8. The method of claim 1, further comprising modulating the determined crown height by a predetermined distance.

9. The method of claim 1, wherein the determining the center of resistance of the tooth based on the determined crown height and the determined tooth axis comprises:

retrieving, from a memory, an approximate root length based on the determined crown height;

dividing the approximate root length by two to define a center of resistance distance;

determining the center of resistance of the tooth as a point along the tooth axis at a distance relating to the center of resistance distance from a crown start point.

10. The method of claim 1, wherein the image data is associated with a plurality of teeth crowns of the patient, and the determining the tooth mesh from the image data comprises determining a separate tooth mesh for each one of the plurality of teeth crowns.

11. The method of claim 1, further comprising displaying the image data and one or both of the determined tooth axis and the determined center of resistance.

12. The method of claim 1, further comprising determining an orthodontic treatment using the determined center of resistance.

13. A method for determining a center of resistance point of a tooth for orthodontic treatment planning, the method being executable by a processor, the method comprising:

receiving image data associated with a tooth crown of a patient;

determining a tooth mesh from the image data, the tooth mesh being representative of a surface of the tooth crown;

identifying an internal reference point in the image data, the internal reference point being based on a predetermined internal reference point instruction for locating the internal reference point in a given tooth crown;

determining a reference plane in the image data, the reference plane crossing the internal reference point and the tooth mesh and being based on a predetermined reference plane instruction for locating the reference plane relative to the internal reference point for a given tooth;

determining an intersection curve based on an intersection of the reference plane and the tooth mesh, the intersection curve following a shape of the surface of the crown at the reference plane;

determining a tooth axis of the tooth crown based on the intersection curve;

determining a crown height of the tooth crown based on the tooth axis; and determining the center of resistance of the tooth based on the determined crown height and the determined tooth axis.

14. The method of claim 13, wherein the internal reference point comprises a mesiodistal center of the tooth crown, the identifying the internal reference point comprising:

obtaining a mesial point on a mesial side of the tooth crown, and a distal point on a distal side of the tooth crown, generating a mesiodistal line joining the mesial point and the distal point; and identifying the mesiodistal center as a midpoint on the mesiodistal line.

15. The method of claim 14, wherein the reference plane is perpendicular to the mesiodistal line and extends through the mesiodistal center.

16. The method of claim 13, wherein the determining the tooth axis of the tooth crown based on the intersection curve comprises:

bisecting the intersection curve into two intersection curve parts based on a separation point;

generating an average intersection curve using the two intersection curve parts;

generating, based on the average intersection curve, a guide axis using a linear regression algorithm; and determining the tooth axis based on the guide axis.

17. The method of claim 16, wherein if the tooth is a premolar tooth or a molar tooth, the separation point comprises:

a point on the intersection curve which is closest to the internal reference point, and the tooth axis is determined as the guide axis; and if the tooth is an incisor tooth or a canine tooth, the separation point comprises:

for maxillary teeth, a minimum point of the intersection curve along a Z axis direction for maxillary teeth; and for mandibular teeth, a maximum point of the intersection curve in a Z axis direction for mandibular teeth.

18. The method of claim 17, wherein the determining the tooth axis comprises:
- determining a linguolabial reference plane which is parallel to the mesiodistal line;
- dissecting the surface of the tooth crown, by the linguolabial reference plane, into a lingual surface and a labial surface;
- identifying lingual naked edges on the lingual surface of the surface of the tooth crown;
- identifying labial naked edges on the labial surface of the surface of the tooth crown;
- generating a lingual edge curve based on projecting the lingual naked edges onto the linguolabial reference plane;
- generating a labial edge curve based on projecting the labial naked edges onto the linguolabial reference plane;
- generating, based on the lingual edge curve and the labial edge curve, an average linguolabial edge curve;
- determining a linguolabial edge point, the determining comprises:
  - for maxillary teeth, identifying a maximum point of the linguolabial edge curve along a Z axis associated with the linguolabial reference plane; and
  - for mandibular teeth, identifying a minimum point of the linguolabial edge curve along the Z axis associated with the linguolabial reference plane;
- determining the tooth axis by rotating the guide axis around the Z axis associated with the linguolabial reference plane until it matches the linguolabial edge point on the linguolabial plane.

19. A system for determining a center of resistance point of a tooth for orthodontic treatment planning, the system comprising a processor arranged to execute a method, the method comprising:
- receiving image data associated with a tooth crown of a patient;
- determining a tooth mesh from the image data, the tooth mesh being representative of a surface of the tooth crown;
- identifying an internal reference point in the image data, the internal reference point being based on a predetermined internal reference point instruction for locating the internal reference point in a given tooth crown;
- determining a reference plane in the image data, the reference plane crossing the internal reference point and the tooth mesh and being based on a predetermined reference plane instruction for locating the reference plane relative to the internal reference point for a given tooth;
- determining an intersection curve based on an intersection of the reference plane and the tooth mesh, the intersection curve following a shape of the surface of the crown at the reference plane;
- determining a tooth axis of the tooth crown based on the intersection curve;
- determining a crown height of the tooth crown based on the tooth axis; and
- determining the center of resistance of the tooth based on the determined crown height and the determined tooth axis.

20. A system for determining a center of resistance point of a tooth for orthodontic treatment planning, the system comprising a processor arranged to execute a method, the method comprising:
- obtaining a tooth mesh from image data associated with a tooth crown of a patient, the tooth mesh being representative of a surface of the tooth crown;
- identifying an internal reference point in the image data, the internal reference point being a mesiodistal center of the tooth crown, the identifying the internal reference point comprising:
  - obtaining a mesial point on a mesial side of the tooth crown, and a distal point on a distal side of the tooth crown,
  - generating a mesiodistal line joining the mesial point and the distal point;
  - identifying the mesiodistal center as a midpoint on the mesiodistal line;
- determining a reference plane in the image data, the reference plane being perpendicular to the mesiodistal line and extending through the mesiodistal center;
- determining an intersection curve based on an intersection of the reference plane and the tooth mesh, the intersection curve following a shape of the surface of the crown at the reference plane;
- determining a tooth axis of the tooth crown based on the intersection curve;
- determining a crown height of the tooth crown based on the tooth axis; and
- determining the center of resistance of the tooth based on the determined crown height and the determined tooth axis.

* * * * *